US011636738B2

(12) United States Patent
Ludwick

(10) Patent No.: US 11,636,738 B2
(45) **Date of Patent: *Apr. 25, 2023**

(54) KENO GAMES WITH BONUS BALL DRAWS AND BONUS MULTIPLIERS

(71) Applicant: Aristocrat Technologies Australia Pty Limited, North Ryde (AU)

(72) Inventor: John Victor Ludwick, Reno, NV (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 28 days.

This patent is subject to a terminal disclaimer.

(21) Appl. No.: 17/230,517

(22) Filed: Apr. 14, 2021

(65) Prior Publication Data

US 2021/0233346 A1 Jul. 29, 2021

Related U.S. Application Data

(63) Continuation of application No. 15/966,272, filed on Apr. 30, 2018, now Pat. No. 10,984,634.

(60) Provisional application No. 62/566,036, filed on Sep. 29, 2017.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ........ *G07F 17/329* (2013.01); *G07F 17/3258* (2013.01); *G07F 17/3265* (2013.01); *G07F 17/3267* (2013.01)

(58) Field of Classification Search
CPC ............................ G07F 17/32; G07F 17/3211
USPC ............................ 463/17, 18, 19, 20, 29, 30
See application file for complete search history.

(56) References Cited

U.S. PATENT DOCUMENTS

| | | | |
|---|---|---|---|
| 6,135,884 | A | 10/2000 | Hedrick |
| 7,704,141 | B1 | 4/2010 | Marks |
| 7,892,084 | B2 | 2/2011 | Yarbrough |
| 8,562,414 | B2 | 10/2013 | Yarbrough |
| 9,691,227 | B2 | 6/2017 | Yarbrough |
| 2009/0197664 | A1 | 8/2009 | Schultz |
| 2009/0197666 | A1 | 8/2009 | Visser |

(Continued)

OTHER PUBLICATIONS

Australian Government IP Australia, "Examination report No. 1 for standard patent application," issued in connection Nith Australian patent application No. 2018204520, dated Dec. 21, 2018, 6 pages.

(Continued)

*Primary Examiner* — Adetokunbo O Torimiro
(74) *Attorney, Agent, or Firm* — McAndrews, Held & Malloy, Ltd.

(57) ABSTRACT

An electronic gaming machine, system, and method are disclosed for conducting a keno game. The keno game may be conducted alone or in conjunction with a bingo game. The electronic gaming machine may receive a wager from a player, and conduct the bingo game and/or keno game in response to the wager. Based on the wager, a quantity of numbered keno balls may be designated as feature numbered keno balls. The electronic gaming machine may conduct the keno game using the feature numbered keno balls, and display a bonus if and/or when one or more feature numbered keno balls match one or more player selected keno numbers.

20 Claims, 16 Drawing Sheets

(56) References Cited

U.S. PATENT DOCUMENTS

| | | | |
|---|---|---|---|
| 2016/0267741 | A1 | 9/2016 | Humphrey |
| 2017/0270740 | A1 | 9/2017 | Yarbrough |

OTHER PUBLICATIONS

Office Action dated Mar. 27, 2020, for U.S. Appl. No. 15/966,272 (pp. 1-7).
Office Action dated Sep. 4, 2020 for U.S. Appl. No. 15/966,272 (pp. 1-7).
Notice of Allowance dated Jan. 1, 2021 for U.S. Appl. No. 15/966,272 (pp. 1-5).
New Slots, Jun. 2016, Arizona Gaming Guide, azgamingguide.com, p. 15.

KENO GAMES WITH BONUS BALL DRAWS AND BONUS MULTIPLIERS

RELATED APPLICATIONS

This application is a continuation of U.S. patent application Ser. No. 15/966,272, filed Apr. 30, 2018, which claims priority to U.S. Provisional Patent Application No. 62/566,036, filed Sep. 29, 2017, the disclosures of which are hereby incorporated by reference herein in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. Awards from any winning outcomes are typically added back to the credit balance and can be provided to the player upon completion of a gaming session or when the player wants to "cash out."

Bingo games are an example of games that may be played on EGMs. In some bingo games, a player receives a bingo card in response to a bingo game wager. A server, possibly after determining that enough players have entered the bingo game, may randomly determine and/or select a set of bingo numbers, and distribute the bingo numbers to the EGMs in the bingo game. The appropriate cells on the bingo card may be marked (or "daubed") based on the bingo numbers.

Keno games may also be played on EGMs. In Keno, a player may be presented with a Keno card. The Keno card may have several cells (e.g., 80 cells), with each cell being associated with a number (e.g., 1-80). The player may pick a certain number of cells on the keno card, and a set of numbers (and/or balls) may then be selected (and/or drawn) at random, such as 20 numbers, for example. A player may be rewarded according to the number of cells they selected that have number corresponding to one of the randomly selected numbers (e.g., "hits" and/or "catches").

In some examples, EGMs may use a random number generator (RNG) to randomly generate elements and/or outcomes of some games (e.g., bingo cards, keno cards, bingo numbers, keno numbers, etc.). The games may be designed to return a certain percentage of the amount wagered back to the player (RTP=return to player) over the course of many plays or instances of the game. The RTP and/or randomness of the RNG bear on the fairness of the games and may therefore be highly regulated. Notably, some games may include an element of skill on the part of the player and, therefore, may not be entirely random.

SUMMARY

Some examples of the present disclosure relate to a keno game that may be played on an EGM and/or within an electronic gaming system (EGS). In some examples, the keno game may be a class III game, where the keno game outcome is determined based on matches between player selected keno card numbers (and/or keno card numbered cells) and a set of drawn (and/or called, selected, chosen, picked, determined, etc.) keno numbers (and/or numbered keno balls). More particularly, the keno game outcome may be based on a number of "hits" (and/or matches) between the player selected keno card numbers and the drawn keno numbers. The keno game outcome may also be based on an associated keno pay table. More particularly, the keno pay table may associate a number of hits with a credit payout. The EGM and/or EGS may provide a credit payout to the player based on the keno game outcome and an initial wager amount provided by the player (e.g., via a user interface).

In some examples, the keno game may include one or more feature keno numbers (and/or numbered keno balls). In some examples, the quantity of feature keno numbers may be associated with (and/or dependent upon) a player wager. For example, the player may select the quantity of feature keno numbers when selecting a wager amount. In some examples, a higher quantity of feature keno numbers may be associated with a higher wager, and a lower quantity of feature keno numbers may be associated with a lower wager. In some examples, the EGM and/or EGS may designate one or more keno numbers (and/or numbered keno balls) to be feature keno numbers (and/or feature numbered keno balls). The quantity of keno numbers designated to be feature keno numbers may be based on (and/or dependent on, equal to, etc.) the selected quantity of feature keno numbers. If one or more feature keno numbers are thereafter selected (and/or drawn), the EGM and/or EGS may compare the feature keno numbers to the player selected keno card numbers to determine if there are any "feature hits." The EGM and/or EGS may provide one or more bonuses to a player depending on the number of feature hits. In some examples, the bonuses may include an increased credit payout (e.g., credit/win multiplier), a separate feature keno prize (e.g., additional credits), an additional draw of keno numbers (which may lead to additional hits and, if there are additional unselected feature keno numbers, additional feature hits and/or additional bonuses), and/or other appropriate rewards.

In some examples, the keno game may be a class II game, where the EGM and/or EGS may present a non-keno game outcome (e.g., bingo game outcome) to the player in the form of a keno game outcome. In such examples, the non-keno game and/or non-keno game outcome may be independent of the keno game and/or keno game outcome. In contrast, the keno game and/or keno game outcome may be dependent upon the non-keno game and/or non-keno game outcome. For example, the keno game outcome may be predetermined to be equivalent to the non-keno game outcome.

In some examples, the non-keno game may be a networked bingo game, where the EGM and/or EGS may determine a bingo game outcome based on a bingo game pay table and comparisons between a list of drawn/called/selected bingo numbers and the numbered cells of a bingo card. The bingo game outcome may be a losing outcome with no reward if there are no winning bingo combinations/patterns present, or a winning outcome with some reward (e.g., a credit payout) if there are one or more winning bingo combinations/patterns present. For example, a winning bingo combination/pattern may comprise a particular predefined combination/pattern of bingo card numbered cells (e.g., as defined in the bingo pay table) that match numbers in the list of bingo numbers within a predefined quantity of numbers called (e.g. within the first 10, 20, 30, 40, etc. numbers called). In such an example, the non-keno game (e.g., bingo game) outcome (and/or credit payout) may be determined by the EGM and/or EGS independent of the keno game, but may still presented to the player as if it were the outcome/result of the keno game.

In examples where the outcome of a non-keno game is presented to a player through a keno game simulation, the keno game's "hits," "feature hits," and/or bonuses may be predetermined in order to simulate a keno game outcome that is equivalent to the non-keno game outcome. Thus, the drawn keno numbers may be predetermined and/or preselected (rather than randomly selected), based on the player selected keno numbers, in order to simulate a keno game outcome equivalent to the non-keno game outcome. Likewise, feature keno numbers may be predetermined and/or preselected (rather than randomly selected), in order to simulate a keno game outcome equivalent to the non-keno game outcome. Bonuses presented to the player as a result of feature hits may in fact be predetermined in order to simulate a keno game outcome equivalent to the non-keno game outcome.

These and other advantages, aspects and novel features of the disclosure, as well as details of an illustrated example thereof, will be more fully understood from the following description and drawings.

DRAWING DESCRIPTIONS

Examples of the disclosure will now be described with reference to the accompanying drawings in which.

The figures are not necessarily to scale. Various dimensions may be exaggerated for illustrative clarity. Where appropriate, similar or identical reference numerals are used to refer to similar or identical components.

DESCRIPTION

Figure 1:
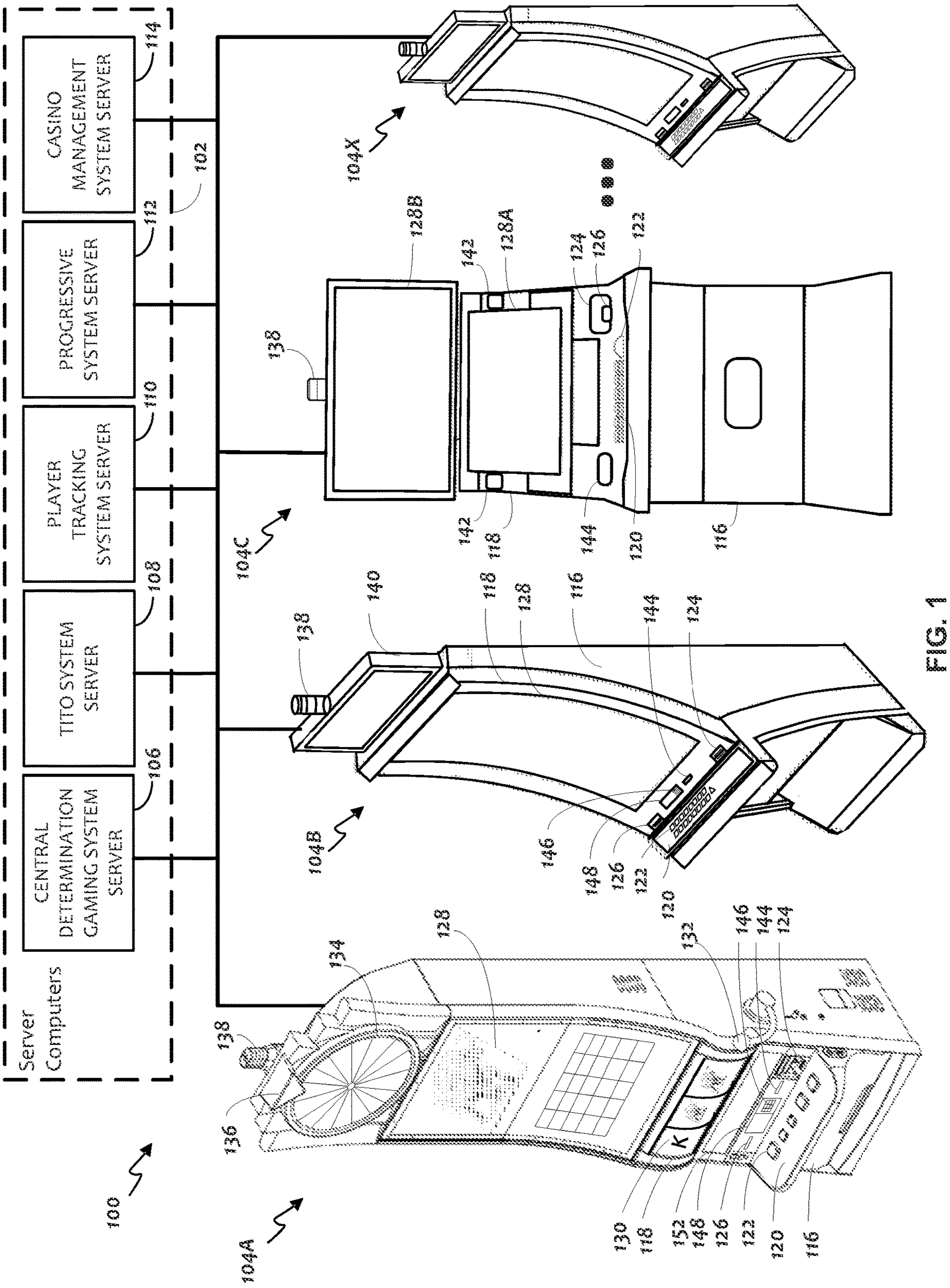
FIG. 1 is an example diagram showing several EGMs networked with various gaming related servers.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The term "data" as used herein means any indicia, signals, marks, symbols, domains, symbol sets, representations, and any other physical form or forms representing information, whether permanent or temporary, whether visible, audible, acoustic, electric, magnetic, electro-magnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term “network” as used herein includes both networks and inter-networks of all kinds, including the Internet, and is not limited to any particular network or inter-network.

The term “processor” means processing devices, apparatuses, programs, circuits, components, systems, and subsystems, whether implemented in hardware, tangibly embodied software, or both, and whether or not it is programmable. The term “processor” as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other examples, the gaming devices 104A-104X may communicate with one another and/or the server computers 102 over RF, cable TV, satellite links and the like.

In some examples, server computers 102 may not be necessary and/or preferred. For example, the present invention may, in one or more examples, be practiced on a stand-alone gaming device such as gaming device 104A, gaming device 104B or any of the other gaming devices 104C-104X. However, in some examples, multiple EGMs may be connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

In the example of FIG. 1, gaming device 104A is of a cabinet construction which may be aligned in rows or banks of similar devices for placement and operation on a casino floor. The gaming device 104A includes a main door 116 which provides access to the interior of the cabinet. As shown, the gaming device 104A also includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In some examples, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some examples, the bill validator 124 may also function as a “ticket-in” reader that allows the player to use a casino issued credit ticket to load credits onto the gaming device 104A (e.g., in a cashless ticket (“TITO”) system). In such cashless examples, the gaming device 104A may also include a “ticket-out” printer 126 for outputting a credit ticket when a “cash out” button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some examples, a player tracking card reader 144, a transceiver for wireless communication with a player's smartphone, a keypad 146, and/or an illuminated display 148 for reading, receiving, entering, and/or displaying player tracking information is provided in EGM 104A. In such examples, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also sometimes used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some examples, the information panel(s) 152 may be implemented as an additional video display.

Gaming devices 104A have traditionally also included a handle 132 typically mounted to the side of main cabinet 116 which may be used to initiate game play.

Figure 2:
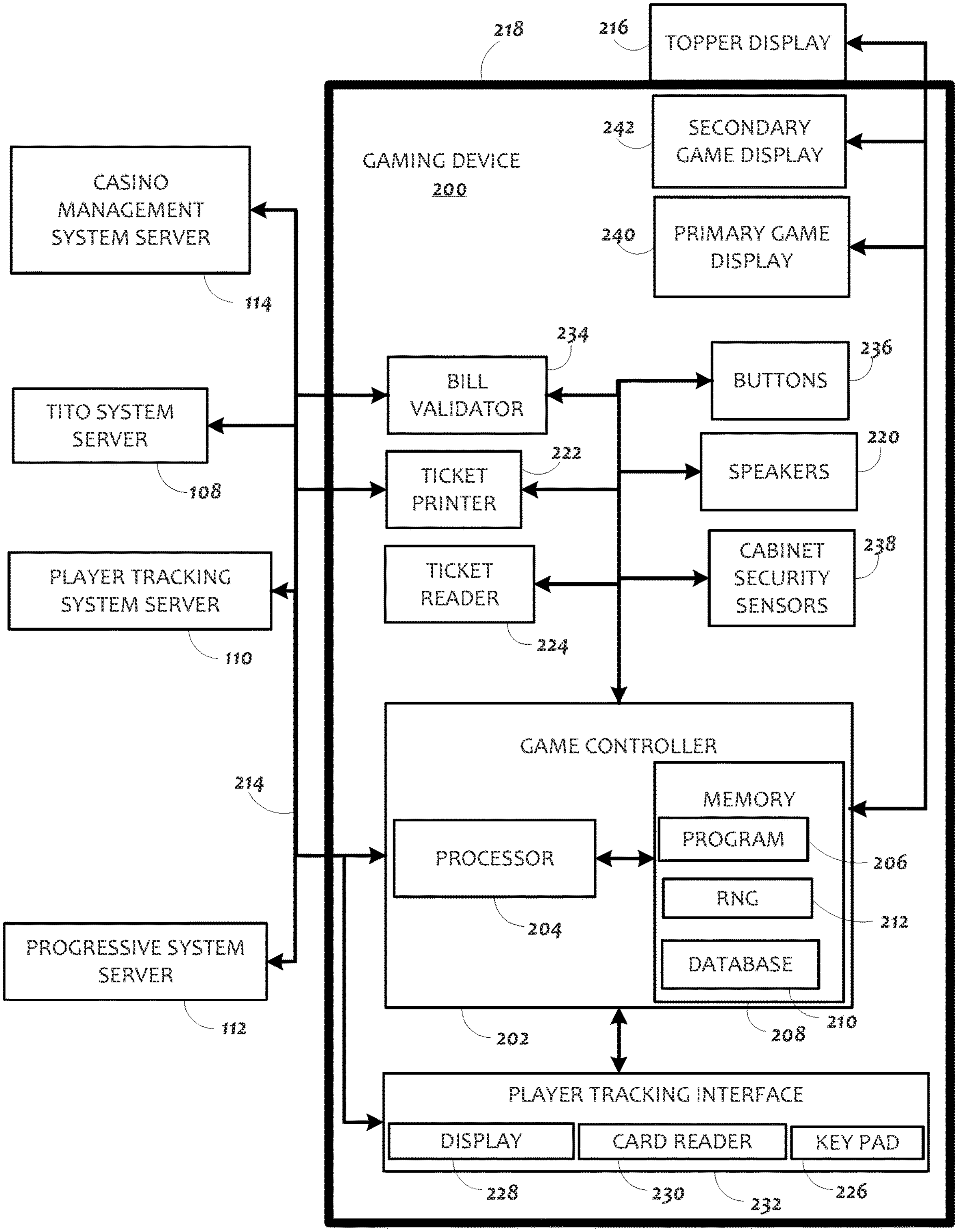
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing examples of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A example are also identified in the gaming device 104B example using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some examples, topper screen 140 may also or alternatively be used to display progressive jackpot prizes available to a player during play of gaming device 104B.

Example gaming device 104B includes a main cabinet 116 including a main door 116 which opens to provide access to the interior of the gaming device 104B. The main or service door 116 is typically used by service personnel to refill the ticket-out printer 126 and collect bills and tickets inserted into the bill validator 124. The door 116 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some examples, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting example internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or credit input mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media, or a device, such as a smart phone enabling player tracking, or other physical items such as a player card. Ticket printer 222 may be used to print tickets for a TITO system server 108, or as a payout mechanism to print award tickets to a player. The gaming device 200 may further include a bill validator 234 for receiving a physical item representing a monetary value for establishing a credit balance, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1). In some examples, the input and/or output mechanisms of the gaming device 200 (e.g., the lights, speakers 220, displays 240, 242, keypad 226, input buttons 236, etc.) may comprise a user interface.

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
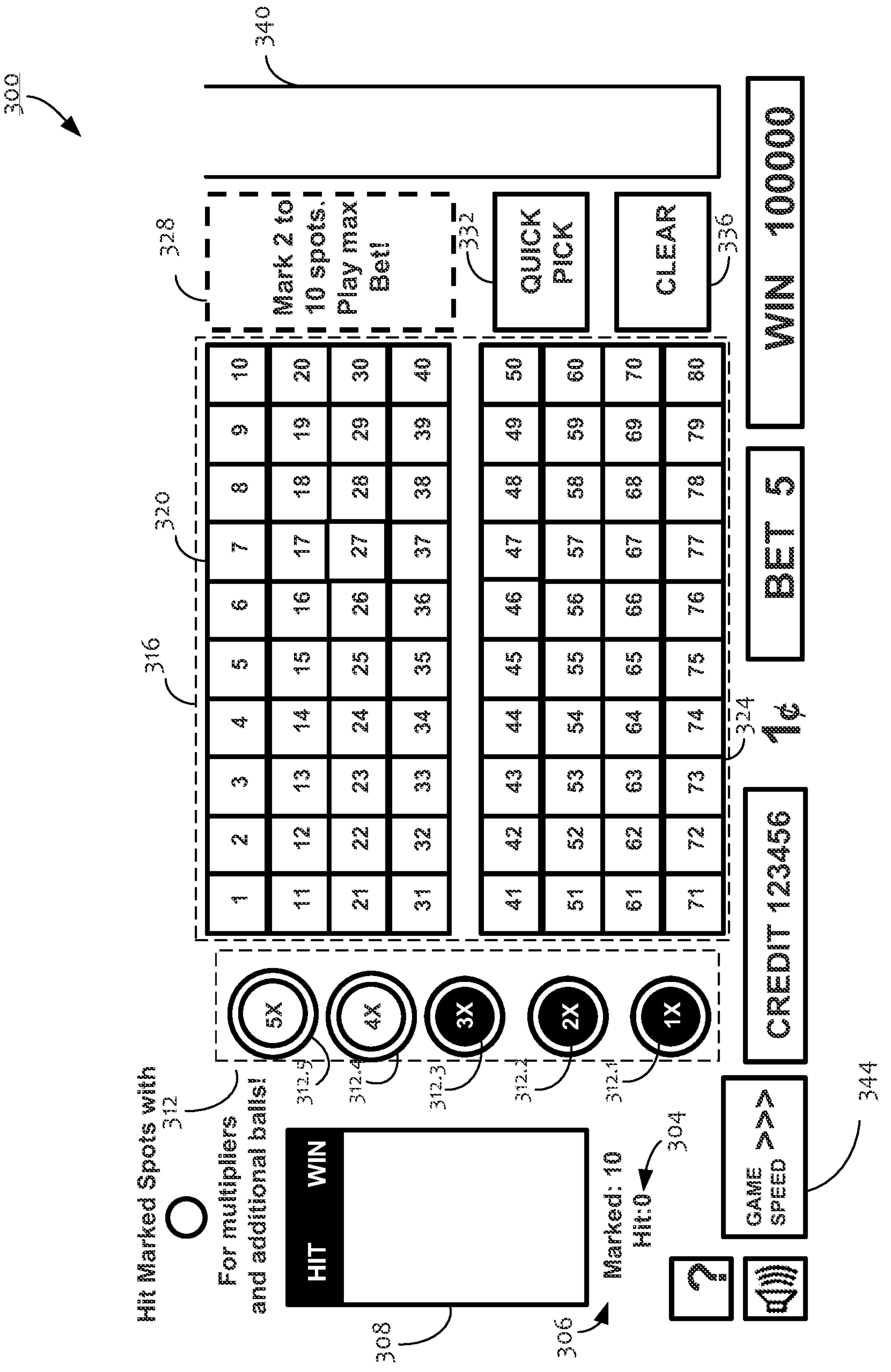
FIG. 3 shows a simulated keno game.

FIG. 3 shows an example simulated keno game 300, such as may be played, simulated, and/or conducted on a gaming device 200 (and/or gaming device 104), and/or displayed on a display 128 (and/or display 240, 242) before, during, and/or after the simulated keno game is played. In the example of FIG. 3, the simulated keno game 300 includes a keno card 316 (and/or keno ticket) having 80 numbered cells (and/or keno numbers) arranged into eight rows and ten columns. In the example of FIG. 3, the keno card 316 includes an upper portion 320 having numbered cells 1 through 40, and a lower portion 324 having numbered cells 41 through 80. In some examples, the keno card 316 may be arranged differently. In some examples, a player may make a selection of numbered cells through the user interface of the gaming device 200 (and/or gaming device 104).

As shown, the simulated keno game 300 further includes a game speed button 344 that allows a player to adjust a speed of simulated keno game 300. In some examples, the game speed button 344 may allow a player to adjust a rate at which keno balls selected are displayed. For example, at a minimum game speed, keno balls may take 10 seconds to fully populate and completely settle in cylinder 340. At a medium game speed, keno balls may take 7 seconds to fully populate and completely settle in the cylinder 340. At a maximum game speed, keno balls may take 4 seconds to fully populate and completely settle in the cylinder 340.

The simulated keno game 300 also includes a volume control that may allow a player to adjust a volume of the simulated keno game. In the example of FIG. 3, the simulated keno game 300 further includes a question mark (e.g., ?) button that may allow a player to access a help menu. As shown, the simulated keno game 300 also includes a credit balance, a wager (and/or bet) indicator, and a credit reward/payout indicator (e.g., WIN). The simulated keno game 300 further includes a quick pick button 332 that, when activated, prompts the simulated keno game 300 to automatically select and/or pick a number of keno numbers (and/or keno card numbered cells) to play. The simulated keno game 300 further includes a clear button 336 that, when actuated, clears keno numbers selected by the player. As shown, the simulated keno game 300 further includes a display area 328 that may be used by the gaming device 200 to display game play messages to a player (e.g., "Game over. Play now!"; "Big Win!"; "Red Ball Feature Initiated/Triggered"; "Additional Balls Awarded!"; "Mark spots or press PLAY"; "Select a bet or press PLAY"; "Mark 2 to 10 spots. Play max Bet!", etc.). In the example of FIG. 3, the simulated keno game 300 also includes a column/cylinder 340 to collect keno numbers (and/or numbered keno balls) that are drawn.

In the example of FIG. 3, the simulated keno game 300 also includes a hit counter 304 that monitors a quantity of matches (and/or "hits") between player selected keno card numbers (and/or numbered cells) and drawn keno numbers (and/or numbered keno balls). In some examples, the hit counter 304 may instead be a hit meter, a hit bar, or some other visual indication of the number of matches (and/or "hits"). As shown, the keno game 300 further includes a marked counter 306 that monitors a quantity of keno numbers that a player has selected and/or marked. In the example of FIG. 3, the keno game 300 further includes a pay table 308 that may list an amount of credits to be awarded based on a number of hits, such as the number of hits indicated by the hit counter 304.

In the example of FIG. 3, the simulated keno game 300 further shows a list 312 of feature multiplier indicators 312.X. The list 312 may monitor a quantity of matches (and/or "feature hits") between player selected keno numbers and drawn feature keno numbers (and/or feature numbered keno balls, further discussed below). Each feature multiplier indicator 312.X may be associated with a certain number of feature selections and/or feature hits. Feature multiplier indicators 312.X may be activated if/when an associated number of feature selections are made. Feature multiplier indicators may be highlighted if/when an associated number of feature hits occur. In this way, a player may observe a running tally of feature selections and/or feature hits on the display 128 during operation of the simulated keno game 300. In some examples, when a drawn keno number is a feature keno number (for example, a numbered red ball), and matches a player selected keno number, a multiplier 312.X on the list 312 is activated and/or highlighted to indicate to a player that the amount of credits to be awarded (such as may be shown on the pay table 308, for example) may be multiplied to increase the amount of credits to be awarded. In some examples, the credit payouts (associated with hits) shown in the pay table 308 may be increased (e.g., multiplied) in accordance with the highlighted feature multiplier indicator 312.X. While the feature multiplier indicators 312.X in the list 312 are 1×, 2×, 3×, 4×, and 5× in the example of FIG. 3, in some examples, there may be more or less feature multiplier indicators 312.X (e.g., 3 indicators, 7 indicators, 10 indicators, etc.), and/or the feature multiplier indicators may be larger and/or smaller than those shown in FIG. 3.

In some examples, the player may be presented with the keno card 316 when the simulated keno game commences. The player may select a plurality of keno numbers (and/or numbered cells) on the keno card 316. In some examples, the value of the multipliers 312.X may be impacted by the quantity of keno numbers (and/or numbered cells) that a player selects on the keno card 316. For example, the multiplier 312.1 may be 3× when the player makes only 1-3 selections, but may drop to 2X if the player makes 4-10 selections. After the player has selected a quantity of keno numbers, twenty (20) of the 80 numbered keno balls may be drawn (and/or selected). In some examples, more or less than 20 numbered keno balls may be drawn. The drawn keno balls may be shown and/or animated on the display 128 (and/or display 240, 242) as being moved into the area of the cylinder 340. In some examples, the game controller 202 may be configured to select the numbered keno balls using the RNG 212. In some examples, the gaming device 200 may determine hits and/or misses based on a comparison between the player selected keno numbers and the drawn keno numbers.

A "catch" and/or "hit" may be a player selected keno number (and/or keno card numbered cell) that matches one of the drawn numbered keno balls. The gaming device 200 (and/or game controller 202) may increment the hit counter 304 in response to a hit. A "miss" may be a player selected keno number that was not one of the 20 balls drawn. In some examples, the outcome of the simulated keno game 300 may be based, at least in part, on the number of "hits." In such examples, the player may receive a reward (e.g., a credit payout) according to the number of "hits" on the keno card 316. In some examples, when the bonus red ball features commences, additional keno balls may be displayed at a different rate than the keno balls are initially displayed.

Figure 4:
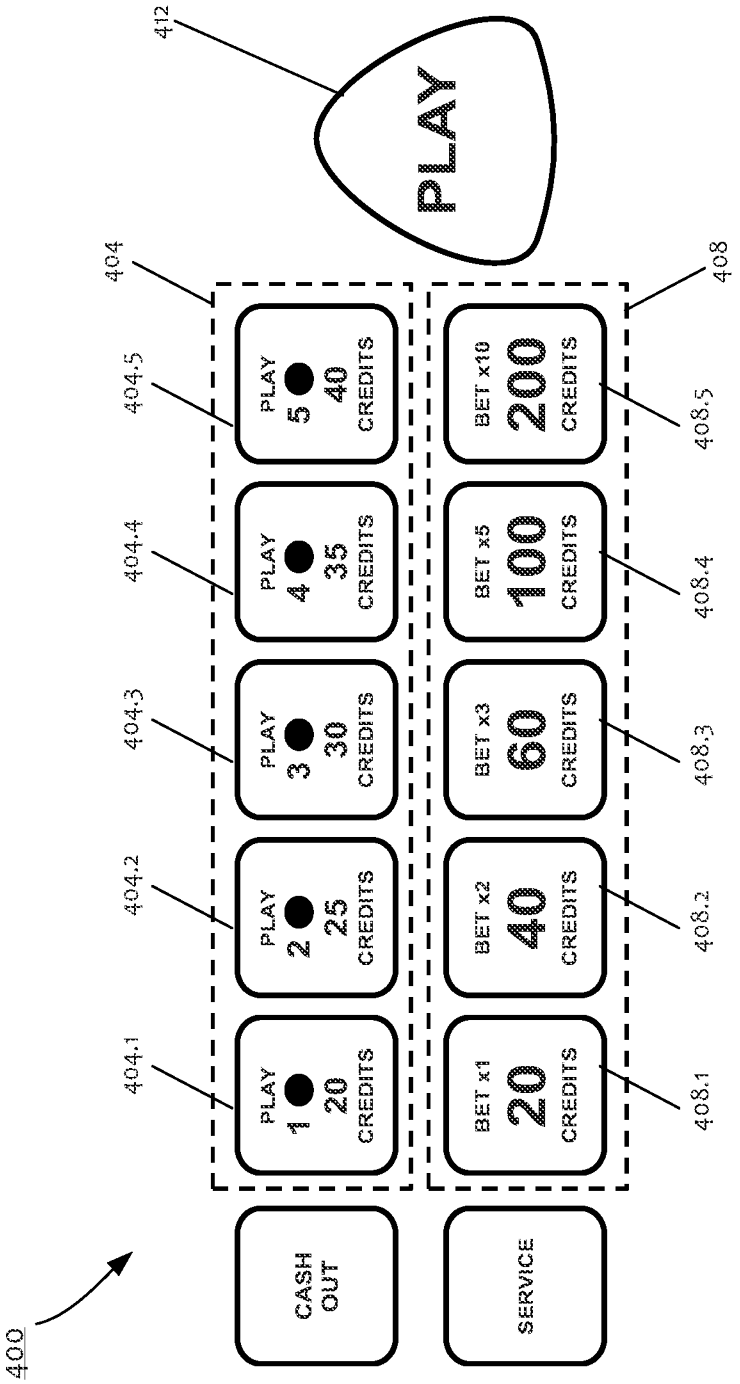
FIG. 4 shows an example player interface.

FIG. 4 shows an example player interface 400 that a player may use to initiate the simulated keno game. In some examples, the example player interface 400 may be implemented through the user interface of the gaming device 200 (e.g., touch screen display 240, keypad 226, input buttons 236, etc.). As shown, the example button panel 400 provides a plurality of different wager options on a top row of buttons 404.X, and a plurality of different wager multipliers on a bottom row of buttons 408.X. The top row of buttons 404 includes a minimum wager (e.g., 20 credits) 20-credit button 404.1 that plays with one (1) feature keno number in the form of a red ball, a 25-credit button 404.2 that plays with two (2) feature keno numbers in the form of two (2) red balls, a 30-credit button 404.3 that plays with three (3) feature keno numbers in the form of three (3) red balls, a 35-credit button 404.4 that plays with four (4) feature keno numbers in the form of four (4) red balls, and a 40-credit button 404.5 that plays with five (5) feature keno numbers in the form of five (5) red balls. The bottom row of buttons 408 includes a 1×-multiplier button 408.1 (20 credits when played with the minimum wager), a 2×-multiplier button 408.2 (40 credits when played with the minimum wager), a 3×-multiplier button 408.3 (60 credits when played with the minimum wager), a 5×-multiplier button 408.4 (100 credits when played with the minimum wager), and a 10×-multiplier button 408.5 (200 credits when played with the minimum wager).

In some examples, the buttons 408 may reflect different multipliers, instead of the ones shown in FIG. 4 (e.g., 1×, 2×, 3×, 4×, 5×; or 1×, 2×, 4×, 8×, 10×; etc.). In some examples, the buttons 408 may be dynamic, such that the displayed credit value of the buttons 408 is changed and/or adjusted (e.g., via the game controller 202) based on the selected and/or activated top row button 404. For examples, if button 404.2 is activated, button 408.1 may indicate 25 credits, button 408.2 may indicate 50 credits, and so on. In some examples, only one top row button 404 and/or one bottom row button 408 may be activated at a given time. In some examples, the bottom row buttons 408 and/or the play button 412 may be considered committal buttons, such that the keno game may begin (e.g., via a ball draw) once one of the bottom row buttons 408 or play button 412 is activated (assuming the credit balance is sufficient for the selected wager).

To play the keno game, a player may first make a wager selection on the top row of buttons 404 to choose a quantity of feature keno numbers (e.g., red balls), and a wager multiplier selection on the bottom row of buttons 408. The wager selection may determine the quantity of numbered keno balls that may be designated as feature numbered keno balls (i.e., red balls). For example, if a player plays three (3) red balls, via the 30-credit button 404.3, three (3) of the eighty (80) balls may be selected (e.g., randomly) to become red balls. In such an example, when keno numbers or keno balls are drawn, zero (0) to three (3) red balls may be selected as part of the draw. Before, concurrently, or after the player has selected the quantity of feature keno numbers or red balls to play with via the top row of buttons 404, the player may pick and/or select a plurality of keno numbers (e.g., between 2 and 10) on the keno card 316. The simulated keno game 300 may be initiated when the player presses the play button 412 and/or a bottom row button 408. When initiated, the gaming device 200 may simulate a draw of numbered keno balls from a hopper.

Figure 5A:
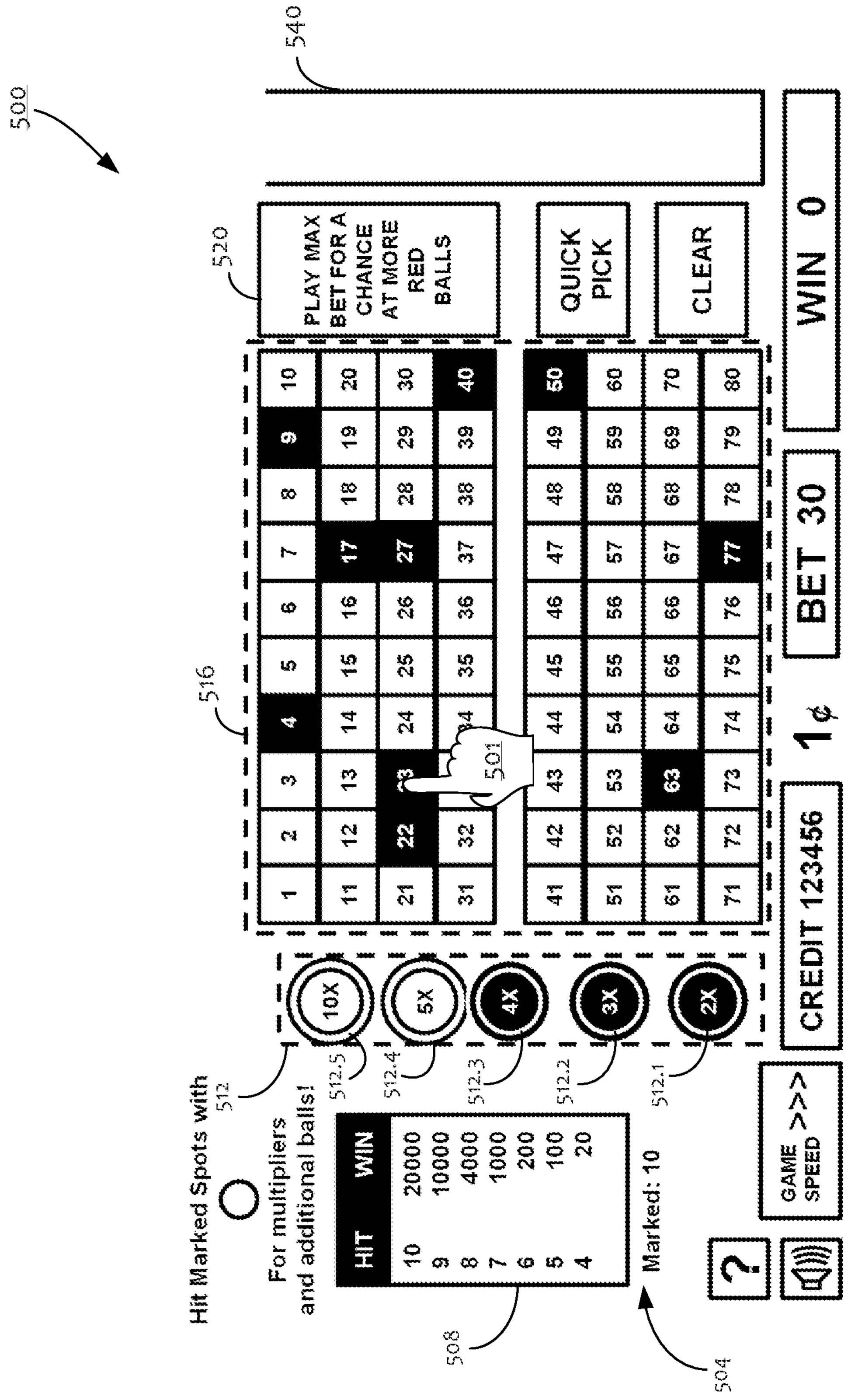
FIG. 5A shows an example simulated keno game when a player selects a plurality of keno numbers.

FIG. 5A shows an example simulated keno game 500 where a player has selected a plurality of keno numbers (and/or numbered cells) on the keno card 516. As a player selects keno numbers (e.g., via a touch of a hand 501 on the touchscreen display 240), a marked counter 504 may be adjusted (e.g. via the game controller 202) to reflect the quantity of keno numbers selected. As shown, the counter 504 displays a "10" below a pay table 508 to indicate a 10-spot selection.

Figure 5B:
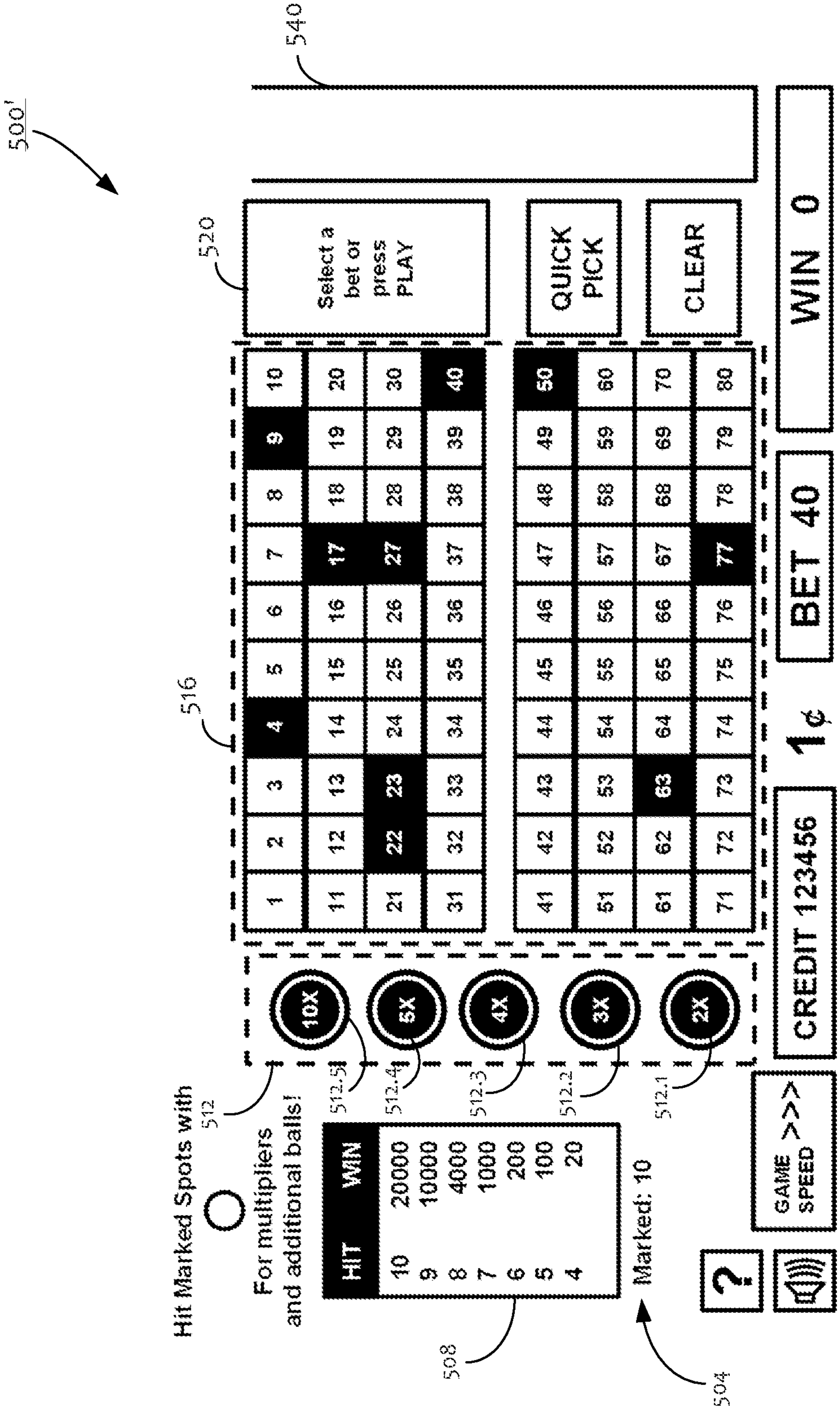
FIG. 5B shows an example simulated keno game when a player selects to activate all multipliers.

The example simulated keno game 500 also shows a feature multiplier list 512 that lists a plurality of feature multiplier indicators 512.1, 512.2, 512.3, 512.4, 512.5. The feature multiplier indicators 512.X correspond to the number of feature keno numbers a player has selected via top row buttons 404, and/or the associated feature multiplier bonus a player may be eligible to receive. In some examples, there may be only one feature multiplier indicator 512.X, and that feature multiplier indicator 512.X may dynamically change based on the number of feature keno numbers a player has selected (and/or a number of feature hits). In the example of FIG. 5A, the player has selected a three-red-balls bet option (for example, via button 404.3 of FIG. 4), resulting in multiplier indicators 512.1, 512.2, 512.3 being activated. In some examples, multipliers 512.4, 512.5, which are not selected, may be greyed out and/or inactive. As shown, the player has selected keno numbers 4, 9, 17, 22, 23, 27, 40, 50, 63, and 77 on keno card 516. A message area 520 prompts to play more red balls for more chances to win. FIG. 5B shows an example simulated keno game 500' where a player has selected (for example, via button 404.5 of FIG. 4) to activate all multiplier indicators 512.1, 512.2, 512.3, 512.4, 512.5, on multiplier list 512.

Figure 6A:
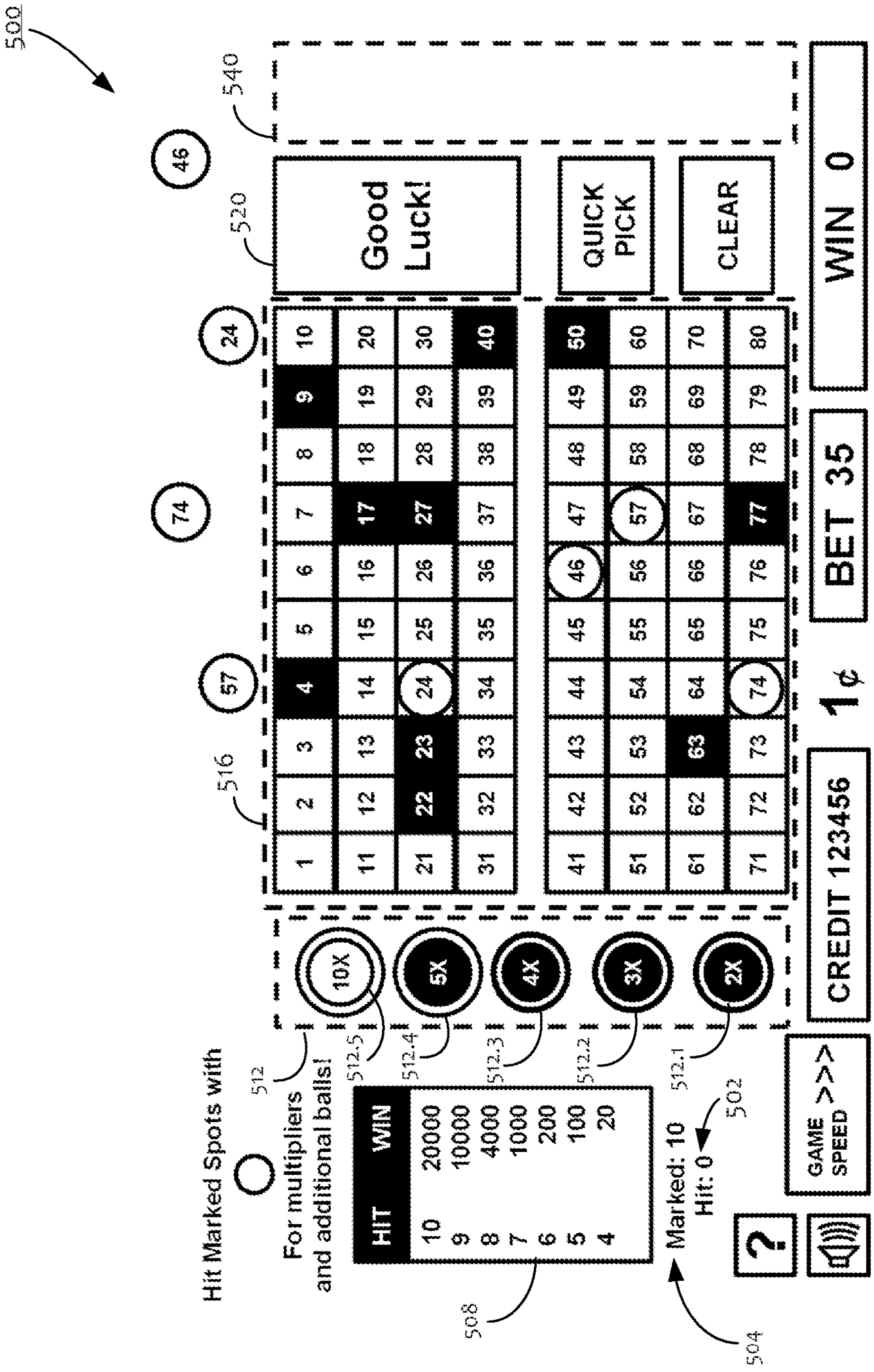
FIG. 6A shows the example simulated keno game of FIG. 5A being populated with selected keno numbers.

FIG. 6A shows the example simulated keno game 500 of FIG. 5A being populated with selected keno balls to be dropped into cylinder 540. As discussed above, the player has selected keno numbers 4, 9, 17, 22, 23, 27, 40, 50, 63, and 77 on keno card 516, and a three-red-balls bet option with three multiplier indicators 512.1, 512.2, 512.3, on multiplier list 512. As shown, the example simulated keno game 500 has selected keno numbers or balls 46, 24, 74, and 57 to be dropped into cylinder 540. In some examples, a classic keno ball sound effect of balls bouncing may be played. A ding sound (and/or other appropriate sound/visual effect) may be played for each ball as the keno card 516 is marked. A mellow ding special effect may be played when an unselected number is marked, and a more intense or higher pitched ding special effect may be played when a selected number is a hit. A cool special effect may be played when a red ball hit occurs. As the player gets hits on the keno card 516, hit meter 502 is incremented.

Figure 6B:
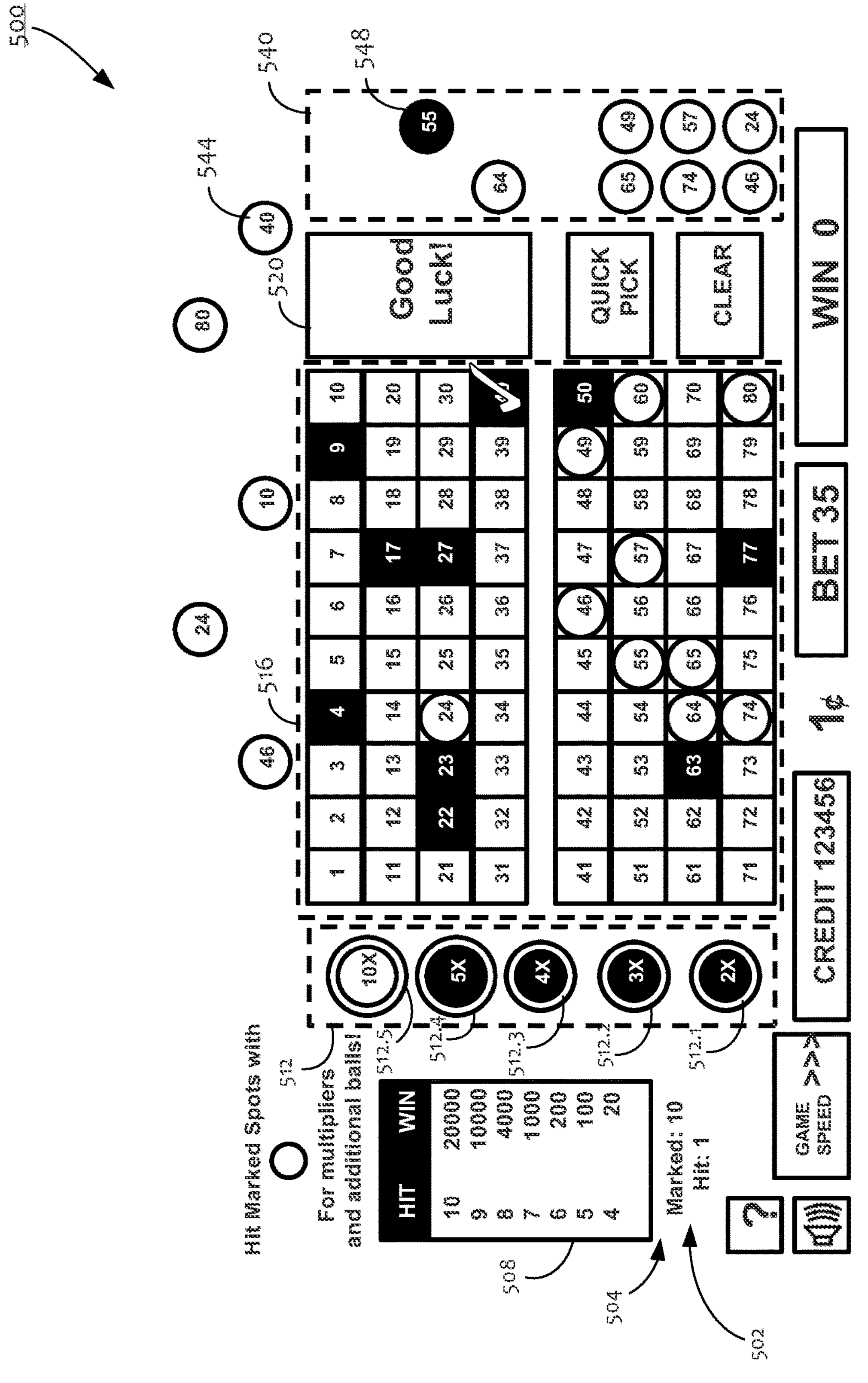
FIG. 6B shows the example simulated keno game of FIG. 6A being further populated with selected keno numbers.

FIG. 6B shows the example simulated keno game 500 of FIG. 6A being further populated with selected keno numbers. Specifically, the example simulated keno game 500 has selected keno ball 544, which is keno number 40. The keno number 40 is also a player selected keno number on the keno card 516, and results in a hit. Selected cells of the keno card 516 that correspond to a selected keno number (i.e., "hits") may be positively marked (e.g., with a check mark), while other, unselected, cells of the keno card 516 that correspond to a selected keno number (i.e. misses) may be negatively marked (e.g., with a circle or some other marking). In the example of FIG. 6B, the cell of the keno card 516 having keno number 40 has been positively marked with a check mark, while the hit meter 502 displays a hit count of 1 in response to the single hit. In the example of FIG. 6B, the player has been rewarded 0 credits for the single hit, since this is too low of a hit count for a payout, as displayed in the pay table 508 (though, in some examples, a minimal award may be provided for even a low number of hits).

As shown, the example simulated keno game 500 has also selected keno ball 548, which is keno number 55. Keno ball 548 is highlighted to reflect that keno ball 548 is also a feature keno ball, or a red ball. However, keno ball 548 does not match any of the player selected keno numbers (4, 9, 17, 22, 23, 27, 40, 50, 63, and 77), so there is neither a hit, nor a feature hit. Thus, the hit meter 502 is not incremented, nor is any feature multiplier indicator 512.X highlighted.

Figure 6C:
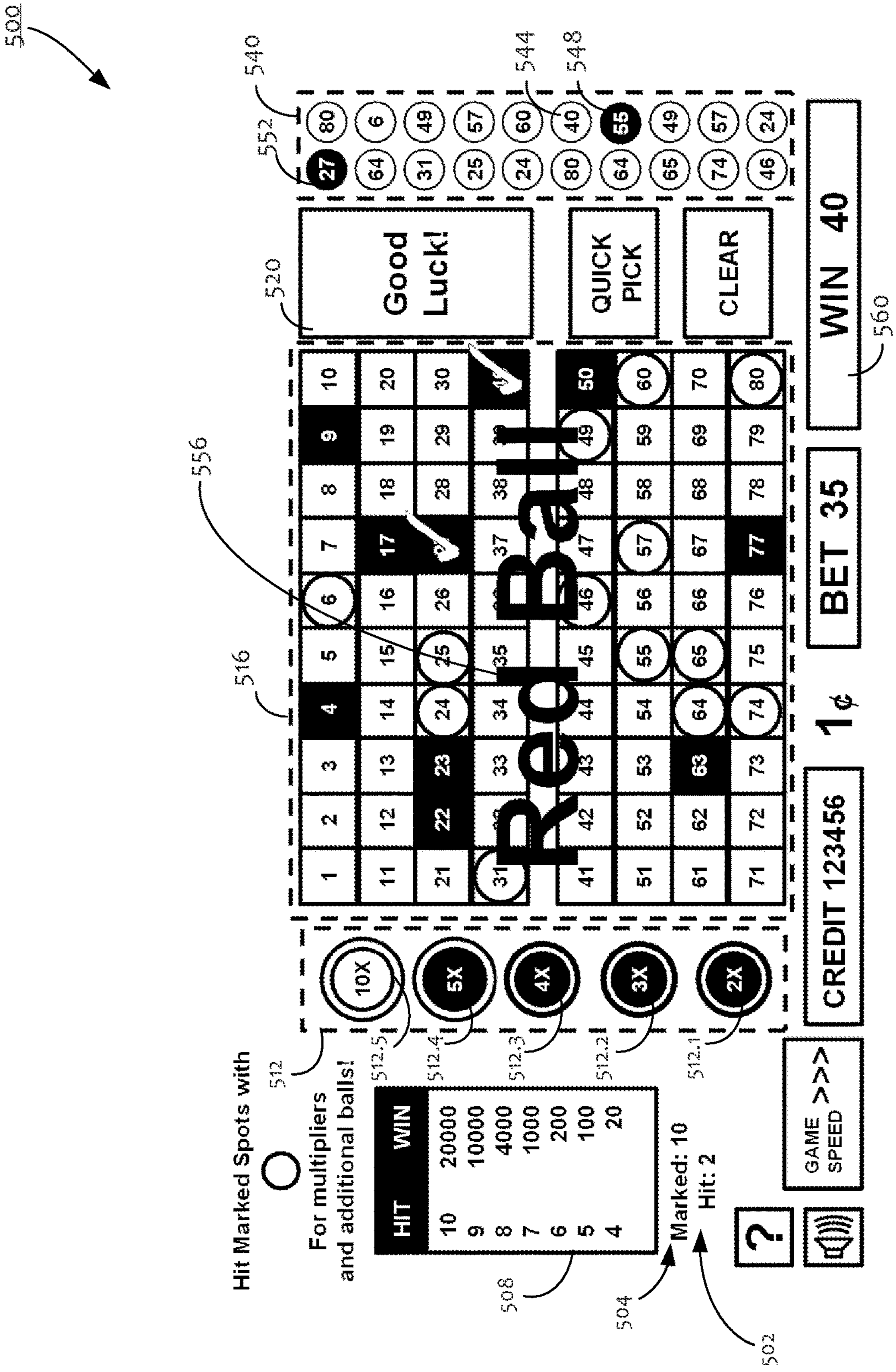
FIG. 6C shows the example simulated keno game of FIG. 6B when a number of selected keno numbers are feature keno numbers in the form of red balls.

FIG. 6C shows the example simulated keno game 500 of FIG. 6B when a number of selected keno numbers are matching keno numbers. As shown, the example simulated keno game 500 has initially selected 20 keno numbers including 24, 46, 57, 74, 49, 65, 55, 64, 40, 80, 60, 24, 57, 25, 49, 31, 6, 64, 80, and 27. Note that some of the keno numbers are selected more than once (e.g., 24, 80, 64). In some examples, each keno number may be selected only once. As discussed, keno ball 544 (keno number 40) is a hit, and is so indicated with a check mark. As shown, keno ball 552 is a feature keno ball or red ball, which is keno number 27, and which matches one of the player selected keno numbers (4, 9, 17, 22, 23, 27, 40, 50, 63, and 77). As a result, a "Red Ball" message 556 is displayed in FIG. 6C, and the hit meter 502 is incremented to two (2), indicating two (2) hits, keno ball 544 and keno ball 552. In some examples, the "Red Ball" message 556 may be accompanied by a voice over announcing a red ball match. In some examples, a different sound effect and/or visual effect may be executed upon a feature hit. While two hits is still too low to register on the pay table 508, the credit balance may be increased based on the feature hit, as reflected at the credit payout indicator 560. In particular, the credit payout indicator 560 indicates an increase of 40 credits (e.g., 20×2) based on the feature hit.

Figure 6D:
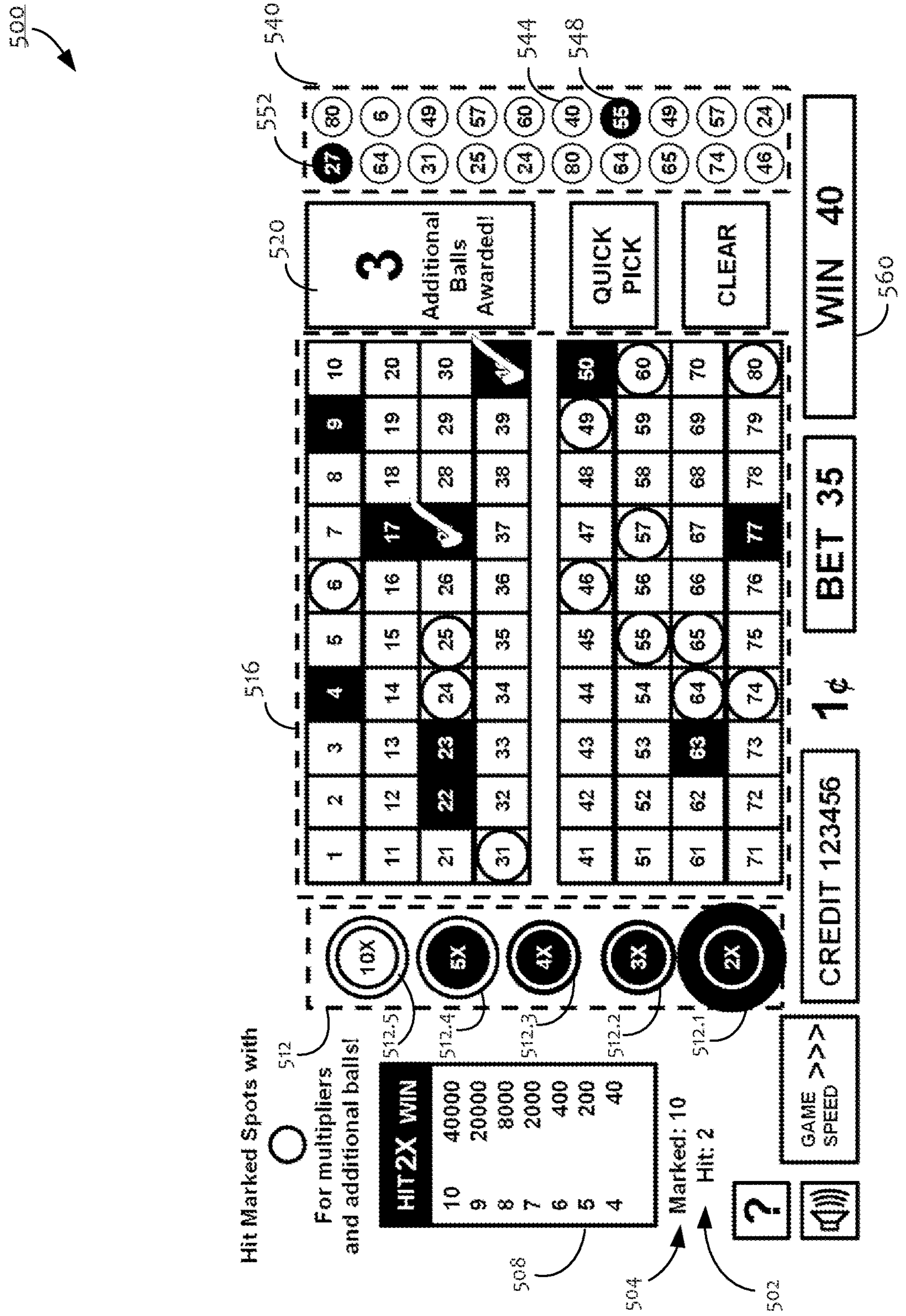
FIG. 6D shows the example simulated keno game of FIG. 6C highlighting a multiplier.

FIG. 6D shows the example simulated keno game 500 of FIG. 6C with feature multiplier indicator 512.1 highlighted, to indicate that feature keno ball 552 matches one of the player selected keno numbers (i.e., 27). In the example of FIG. 6D, the feature multiplier indicator 512.1 is highlighted with an encircling aura. In some examples, a feature multiplier indicator may be highlighted and/or emphasized using an animation (e.g., lighting, electricity, flashing, strobing, etc.) and/or some other visual and/or audio effect. In recognition of the feature multiplier, the pay table 508 displays a message corresponding to the feature multiplier indicator 512.1 (i.e., 2×), and the win credits shown in the pay table 508 are multiplied accordingly.

In some examples, when a drawn feature keno ball matches a player selected keno number, the example simulated keno game 500 (and/or gaming device 200, game controller 202, etc.) may select and/or determine a quantity of additional keno balls and/or keno numbers. In some examples, the quantity of additional keno balls may be predetermined. In some examples, the predetermined quantity of additional keno balls may be fixed based on one or more of wagers made, the gaming machine on which the example simulated keno game 500 is played, a physical location of the gaming machine on which the example simulated keno game 500 is played, player eligibility, a number of times that the player has played the example simulated keno game 500, an associated bingo game outcome and/or other parameters. The additional ball draw may provide a player to gain additional hits. In examples where some feature keno numbers were not initially drawn, the player may have a chance of obtaining additional feature hits.

Figure 6E:
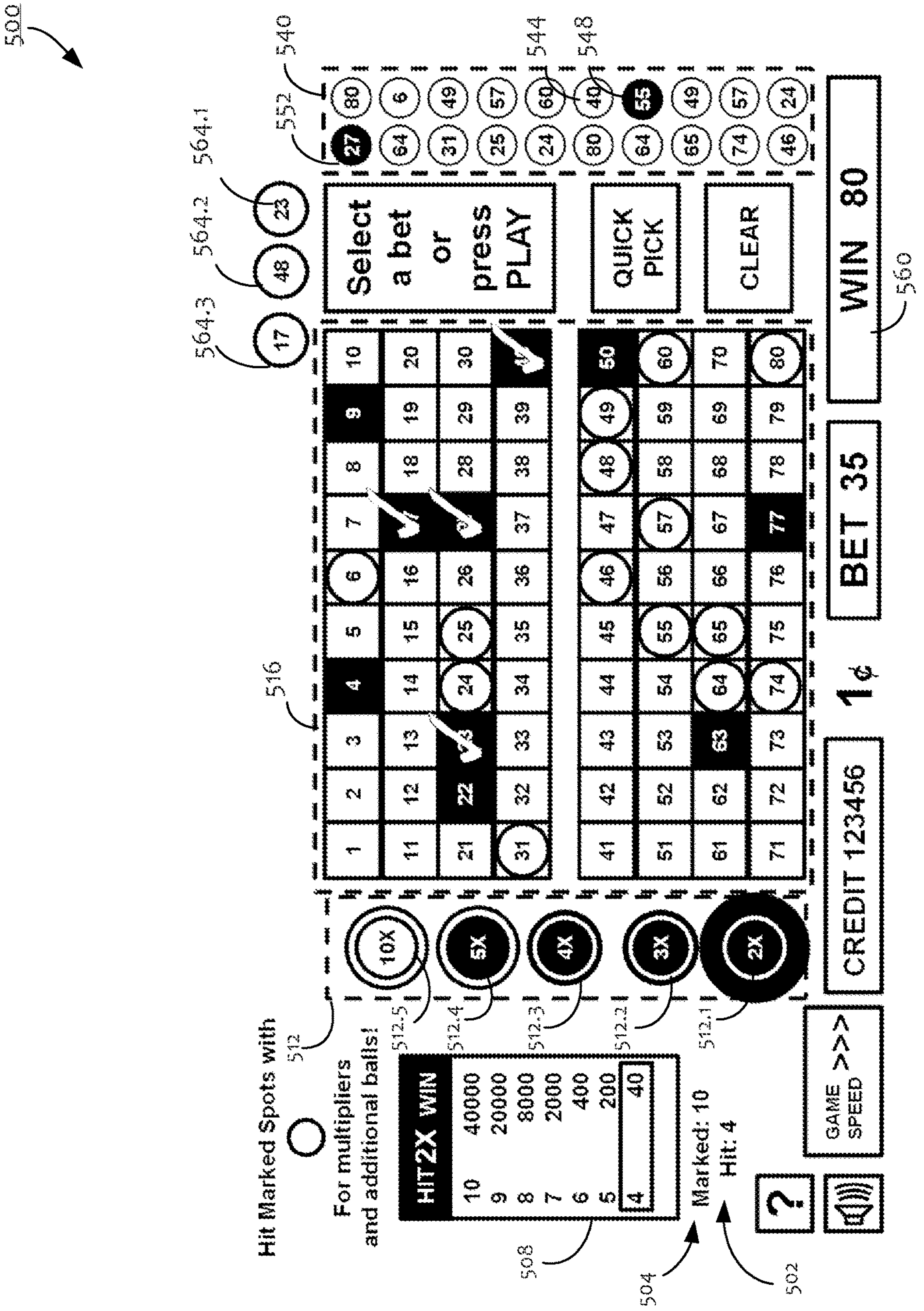
FIG. 6E shows the example simulated keno game of FIG. 6D being populated with additional keno numbers.

FIG. 6E shows the example simulated keno game 500 of FIG. 6D being populated with additional keno numbers in response to keno ball 552, which is a red ball, matching a player selected keno number. As shown, the predetermined quantity of additional keno balls or keno numbers drawn is three (3), as indicated to the player in message area 520 in FIG. 6D. Thus, the example simulated keno game 500 additionally selects and displays three keno balls 564.1 (keno number 23), 564.2 (keno number 48), 564.3 (keno number 17). As shown, the keno balls 564.1 (keno number 23), 564.2 (keno number 48), 564.3 (keno number 17) are regular keno balls. Additionally, keno ball 564.1 (keno number 23) and keno ball 564.3 (keno number 17) match respective player selected keno numbers. As such, the hit meter 502 is incremented to be four (4)—indicating four hits, keno ball 544, keno ball 552, keno ball 564.1, and keno ball 564.3. As shown, the example simulated keno game 500 also shows that, the hit meter 502 displays four hits, which result in a 40-credit win, as indicated by the 2× multiplied pay table 508. With the addition of the 40-credit win for the feature hit, the total win shown in the payout indicator 560 is 80.

Figure 6F:
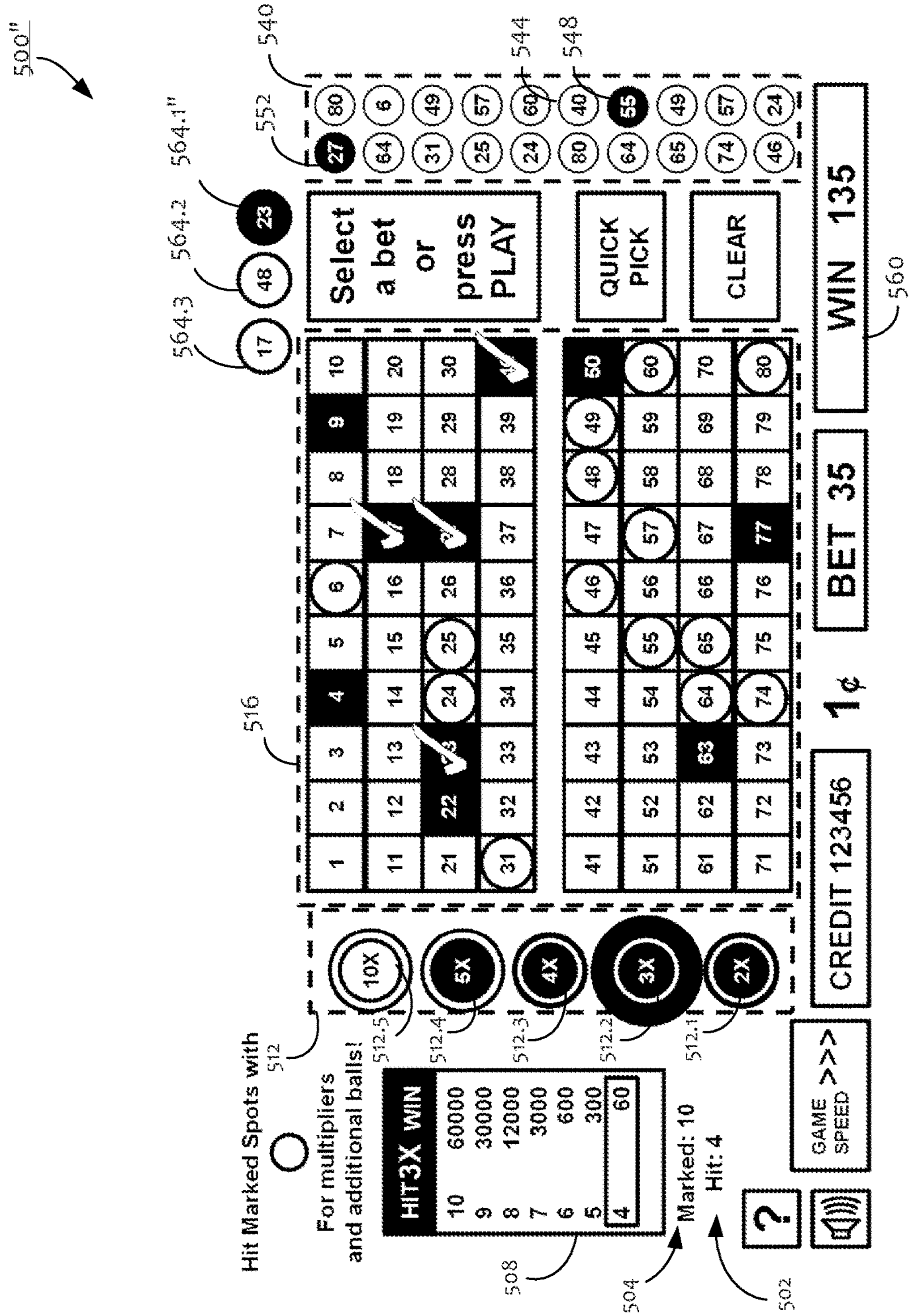
FIG. 6F shows the example simulated keno game of FIG. 6D being populated with additional keno numbers.

FIG. 6F shows another example simulated keno game 500", where the example simulated keno game 500 of FIG. 6D is populated with additional keno balls 564.X. In particular, the example simulated keno game 500" additionally selects and displays three keno balls 564.1" (keno number 23), 564.2 (keno number 48), 564.3 (keno number 17). As shown, the keno ball 564.1" (keno number 23) is a feature keno ball, while keno ball 564.2 (keno number 48) and keno ball 564.3 (keno number 17) are regular keno balls. Additionally, keno ball 564.1" (keno number 23) and keno ball 564.3 (keno number 17) match respective player selected keno numbers. As such, the hit meter 502 is incremented to be four (4)—indicating four hits, keno ball 544, keno ball 552, keno ball 564.1", and keno ball 564.3. Since two of the four hits are feature hits/red ball matches (keno ball 552 and keno ball 564.1"), a larger feature multiplier associated with two feature hits may be applied, as indicated by the "3×" message and multiplied win values in pay table 508. Additionally a larger feature multiplier indicator 512.2 (e.g., 3×-mulitplier indicator 512.2) may be highlighted, while the previously highlighted feature multiplier indicator 512.1 that is associated with only one feature hit is no longer highlighted. In some examples, both multiplier indicators 512.1 and 512.2 may remain highlighted (and/or otherwise emphasized), rather than removing the highlighting for the smaller feature multiplier indicator 512.1. In some examples where a standalone multiplier indicator 512.X is displayed, the standalone multiplier may be incremented to a larger multiplier. In some examples, the 3×-mulitplier indicator 512.2 may be activated differently than how the 2×-multiplier indicator 512.1 is activated, for example, with different animations. While not shown, a "Red Ball" message may also be displayed, similar to FIG. 6C. As shown, the 4 hits results in a 60-credit win with the 3× multiplied pay table 508. An additional 75-credit win is added for the two feature hits (e.g., 25×3), bringing the total win shown in the payout indicator 560 to 135.

Figure 6G:
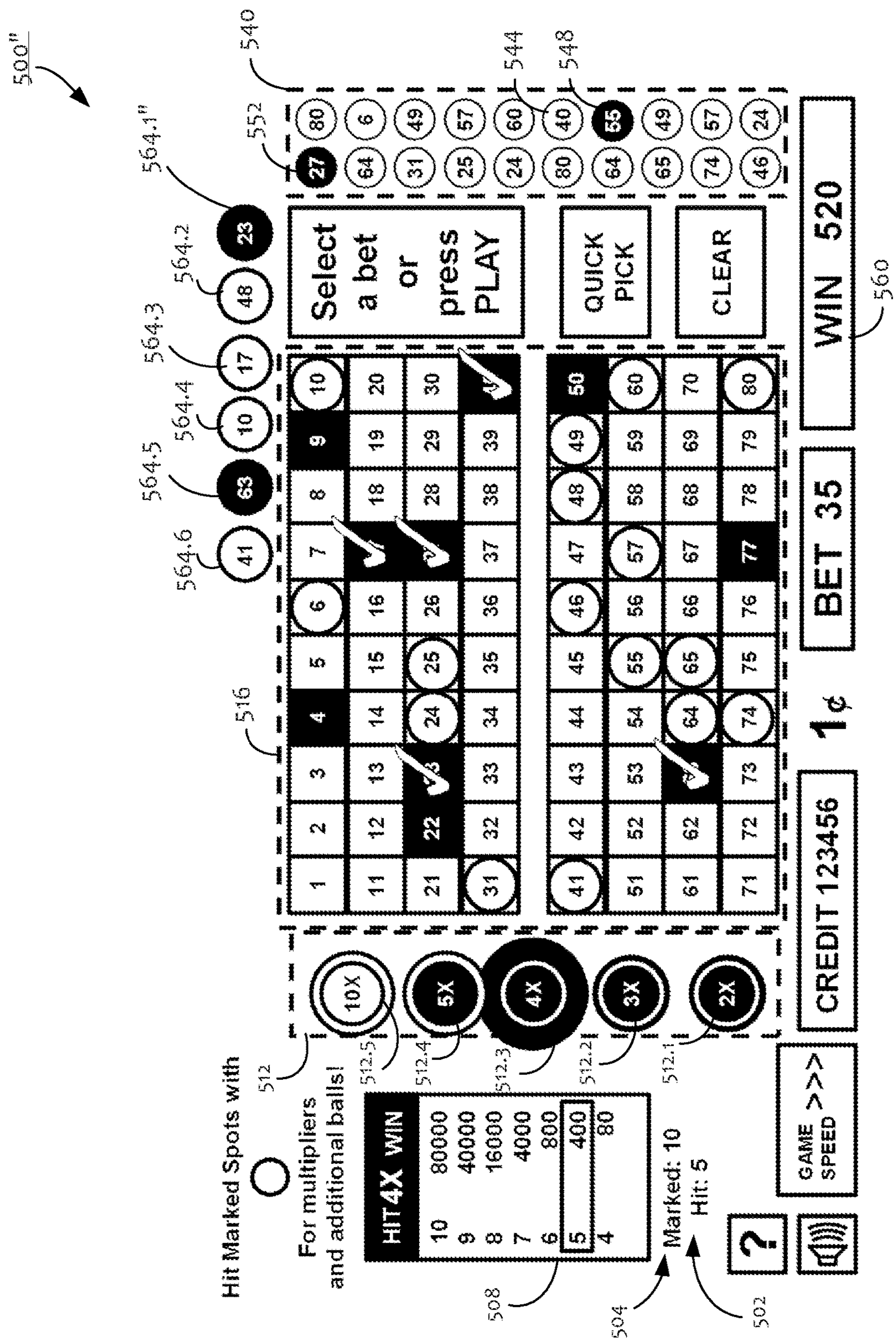
FIG. 6G shows the example simulated keno game of FIG. 6F being further populated with additional keno numbers.

FIG. 6G shows the example simulated keno game 500" of FIG. 6F being further populated with additional keno numbers in response to keno ball 564.1," which is a red ball, matching a player selected keno number. The example simulated keno game 500" additionally selects and displays three keno balls 564.4 (keno number 10), 564.5 (keno number 63), 564.6 (keno number 41). As shown, the keno ball 564.5 (keno number 63) is a feature keno ball that matches a player selected keno number (number 63), while keno ball 564.4 (keno number 10) and keno ball 564.6 (keno number 41) are regular keno balls with no matches. As such, the hit meter 502 is incremented to be five (5)—indicating five hits, keno ball 544, keno ball 552, keno ball 564.1", keno ball 564.3, and keno ball 564.5. Further, the third feature multiplier indicator 512.3 is highlighted to indicate that there have been three feature hits, resulting in a third tier feature multiplier. As the third tier feature multiplier indicator 512.3 is a 4× multiplier, the credit payout associated with the keno win is multiplied by the 4×-multiplier 512.3, as shown in the pay table 508. Because the hit meter 502 displays five hits, the five hits result in a 400-credit win, per the 4× multiplied pay table 508. An additional 120-credit win is added for the three feature hits (e.g., 30×4), bringing the total win shown in the payout indicator 560 to 520.

In the example of FIG. 6G, an additional 3 balls will be selected because of the latest feature hit. However, as the player's initial wager was associated with four feature balls (as indicated by the four activated feature multiplier indicators 512), and four feature balls (547, 552, 564.1", and 564.5) have already been drawn, there is no chance an additional feature ball will be drawn. While the win totals in the payout indicator 560 have been shown in the example figures as incrementing with each ball draw to assist in understanding the examples, in some examples, the payout indicator 560 may only increment at the end of all the ball draws.

Figure 7:
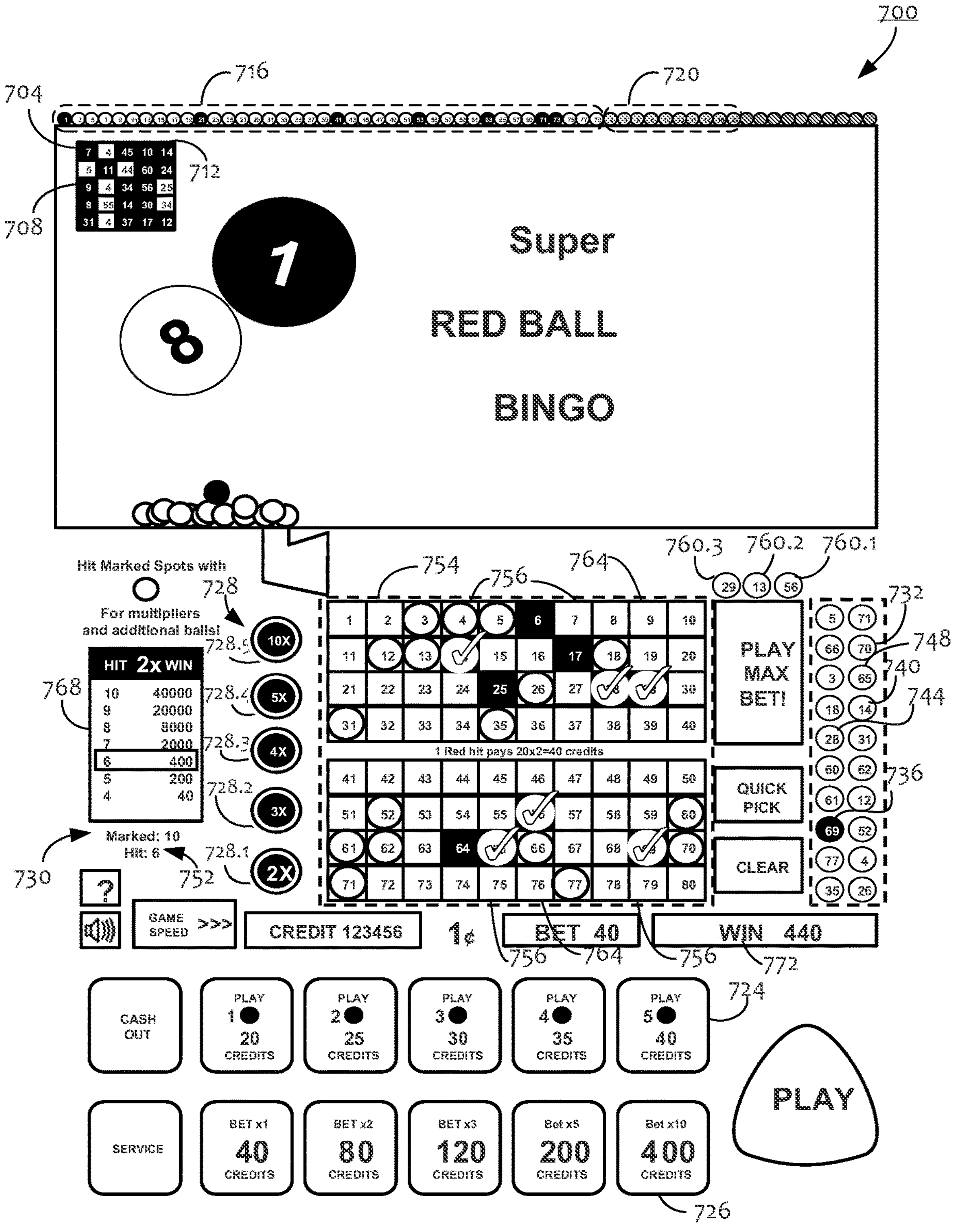
FIG. 7 shows an example simulated keno game with a bonus feature based on an electronic bingo game.

FIG. 7 shows an example simulated keno game 700 that is dependent and/or based on a non-keno game. The non-keno game may be any electronic game (other than keno) that has an electronic game outcome and that provides an electronic game reward (and/or payout). For example, the non-keno game may include, but is not limited to, an electronic bingo game and similar games, slot machine games, casino games, card games, dog or horse racing, lotteries, and all other forms of gaming.

In the example of FIG. 7, the non-keno game is an electronic bingo game 704. In some examples, the bingo game 704 may be a networked game that involves two or more networked gaming devices 200. In some examples, the bingo game 704 may be hosted and/or conducted by one or more networked gaming servers 102 (e.g., central determination gaming system servers 106 and/or other server computers 102). In some examples, bingo game 704 may be entered (and/or initiated, started, begun, etc.) by a player when the player makes a bingo game wager (and/or keno game wager), provided there are a sufficient number of players and/or gaming devices 200 (e.g., 2 or more) participating in the bingo game. If there are too few players and/or gaming devices 200 participating, a "Waiting for Players" message, or some other message, may be displayed until enough players and/or gaming devices 200 participate. In some examples, the one or more servers 102 hosting the bingo game may receive a communication (and/or notification, message, etc.) from the gaming device 200 that the bingo game wager was made.

In the example of FIG. 7, the electronic bingo game 704 includes a bingo card 708. As shown, the bingo card 708 includes a plurality of numbered bingo cells. In particular, the bingo card 708 is a 5×5 grid of cells formed by five rows and five columns. Each of the cells includes a number, except a center cell, which has a free/wild symbol. In the example of FIG. 7, no two cells of the bingo card 708 have the same number. In some examples, the bingo card 708 may be of a different size (e.g., 6×6, 7×7, 10×10, etc.), and one or more cells in a center row/column and/or center cell may include a number or some other symbol or mark rather than a free/wild symbol.

In some examples, the one or more servers 102 may generate and/or select the bingo card 708 in response to a communication that the bingo game wager was made, and transmit the bingo card 708 to the gaming device 200. In some examples, the one or more servers 102 may transmit information to the gaming device 200 and the gaming device 200 may generate and/or select the bingo card 708 (e.g., using the game controller 202 and/or RNG 212) based on the information. In some examples, the gaming device 200 and/or gaming server 102 may select the bingo card 708 from amongst a plurality of potential and/or predetermined bingo cards. In some examples, a player may select their own bingo card 708 using the user interface of the gaming device 200.

In the example of FIG. 7, the electronic bingo game 704 further includes a list of selected/drawn/called bingo numbers (and/or numbered bingo balls). In the example of FIG. 7, the list of bingo numbers comprises 40 primary bingo balls 716 and several additional/secondary bingo balls 720. As shown, the number listing extends across the top of the display, beginning at the upper left corner. The one or more gaming servers 102 may randomly generate and/or select a sequence of numbers forming the number listing. The servers 102 may provide the number listing to the gaming devices 200 participating in the bingo game for display at the gaming devices 200. In some examples, the gaming servers 102 may continue to generate and/or select bingo numbers until a game ending winning bingo pattern is achieved.

Each bingo game 704 may include one or more game ending winning bingo patterns and/or one or more interim winning bingo patterns. A game ending winning bingo pattern may comprise a particular bingo pattern associated with a game ending bingo game winning outcome (e.g. all cells of the bingo card having numbers that match numbers in the bingo list of numbers). A game ending winning bingo pattern/outcome may end the bingo game. The servers 102 may generate bingo numbers until one gaming machine 200 eventually obtains the game ending winning bingo pattern. A new listing of bingo numbers may be generated after a game ending bingo game winning outcome occurs, to begin a new bingo game.

An interim winning bingo pattern may comprise one or more other interim winning bingo patterns associated one or more interim bingo game winning outcomes. Interim winning bingo patterns and/or interim bingo game winning outcomes may occur during the bingo game without ending the bingo game. In some examples, interim winning bingo patterns may include traditional bingo patterns such as, for example, a completed horizontal cell row of the bingo card, a completed vertical cell column of the bingo card, a completed diagonal cell row of the bingo card, four cell corners of the bingo card, and/or all the cells of the bingo card. In some examples, interim winning bingo patterns may comprise less traditional patterns, such as, for example, a seemingly randomly generated subset of cells disposed in no easily discernable arrangement.

A winning bingo game outcome may be determined if there are one or more interim and/or game ending winning bingo combinations/patterns on the bingo card. The bingo game outcome may be a loss for player(s) not achieving a winning bingo pattern. The winning or losing bingo game outcomes for each bingo card 706 may be provided to the corresponding gaming device 200 (and/or to the servers 102). Bingo game winning outcomes may have associated rewards, depending on the winning bingo pattern. Different winning patterns may be associated with different rewards. The reward for a winning bingo game outcome may be based on an amount wagered (e.g., bingo game wager), an associated bingo game paytable, an associated set of rules for the bingo game, a probability (and/or likelihood) of achieving a particular bingo pattern/combination, an amount of bingo numbers needed to achieve the particular bingo pattern/combination, and/or other considerations.

The winning and/or losing bingo game outcome may be presented to a player via the simulated keno game 700. The simulated keno game 700 may simulate one or more keno game outcomes less than or equal to the appropriate bingo game outcome. For example, if the bingo game outcome for a particular gaming machine is a losing outcome, the keno game for that gaming machine may simulate one or more similarly losing keno game outcomes. If the bingo game outcome for a particular gaming machine is a winning outcome, the keno game for that gaming machine may simulate one or more keno game winning outcomes. In some examples, the available reel simulations may not provide for all possible bingo game winning outcomes, so a keno game outcome may be shown with a lesser reward. In such an example, the player may still receive the full reward for the bingo game winning outcome, with the reward being presented as a combination of a credit reward for the displayed keno game outcome, plus 'poof' credits. In some examples, the cumulative reward for the one or more winning keno game outcomes will be less than or equal to the reward for the bingo game winning outcome for a particular gaming machine.

After the bingo game outcome is determined, the game controller 202 of the gaming device 200 may determine an appropriate keno game outcome. As shown in credit payout indicator 772, the payout of the electronic bingo game 704 to be matched is 440 credits. To generate a keno game outcome that is equivalent to the bingo game outcome (e.g., that pays an equivalent payout of the electronic bingo game 704), the example simulated keno game 700 is simulated such that a plurality of keno numbers (and/or a plurality of additional keno numbers) may be selected to match an appropriate quantity of player selected keno numbers. As shown, a player has selected five (5) red balls via red ball button 724 (resulting in all five feature multiplier indicators 728.1, 728.2, 728.3, 728.4, 728.5 being activated in list 728).). As shown, the player has selected to play with ten (10) keno numbers, and has marked keno numbers 6, 44, 17, 26, 28, 29, 56, 64, 65, and 69 as indicated in marked counter 730. Based on the red ball button 724 selected, and the number of marked keno numbers, the pay table 768 is selected from a plurality of keno game pay tables (not shown). In some examples, the pay table 768 may be selected based on additional or alternative criteria.

The example simulated keno game 700 selects a plurality of keno balls to drop into cylinder 732. The keno balls selected include keno numbers 26, 35, 4, 77, 52, 69, 12, 61, 62, 60, 31, 28, 14, 18, 65, 3, 70, 66, 71, and 5. As shown, keno ball 736 (keno number 69) is a feature keno number or a red ball, while keno ball 740 (keno number 14), keno ball 744 (keno number 28), and keno ball 748 (keno number 65) are regular keno balls. Additionally, keno ball 736 (keno number 69), keno ball 740 (keno number 14), keno ball 744 (keno number 28), and keno ball 748 (keno number 65) match respective player selected keno numbers, which causes hit meter 752 to display four (4) initially, and emphasizes the 2×-multiplier 728.1 to be applied to a 20-credit red ball win. As shown in the example of FIG. 7, keno numbers 69, 14, 28, 65 of keno card 754 are overlaid with check marks 756 to indicate hits. In the example of FIG. 7, the feature multiplier indicator 728.1 is emphasized using enlarged alphanumerics to indicate there has been a feature hit. As shown, the rewards (e.g., credit payouts) listed pay table 768 are also multiplied times 2 in accordance with the feature multiplier indicator 728.1, and a corresponding message is displayed in a header of the pay table 768 (i.e., "2×").

Since keno ball 736 (keno number 69) is a feature number or a red ball, the simulated keno game 700 selects a quantity of additional keno balls (or keno numbers). As shown, the quantity of additional keno balls to be selected is three (3), and keno ball 760.1 (keno number 56), keno ball 760.2 (keno number 13), and keno ball 760.3 (keno number 29) are selected. Additionally, keno ball 760.1 (keno number 56) and keno ball 760.3 (keno number 29) match respective player selected keno numbers, which causes hit meter 752 to increase to six (6). Additional check marks 764 overlay the respective player selected keno numbers (keno number 56, and keno number 29. However, the additional keno balls selected do not include any feature keno numbers or red ball, the example simulated keno game 700 ends. As shown, a final hit count of 6 in 2× pay table 768 awards 400 credits (200×2). An additional 40 credits is applied for the single 1 feature hit and/or red ball match (20×2). Thus, credit payout indicator 772 displays a total credit reward/payout of 440 credits, derived from the 200 credits from six (6) hits, a 20 credit prize for getting 1 feature hit (and/or red ball match), and the 2×-multiplier 728.1 highlighted and applied to the total win, equaling 440 total credits awarded.

Figure 8:
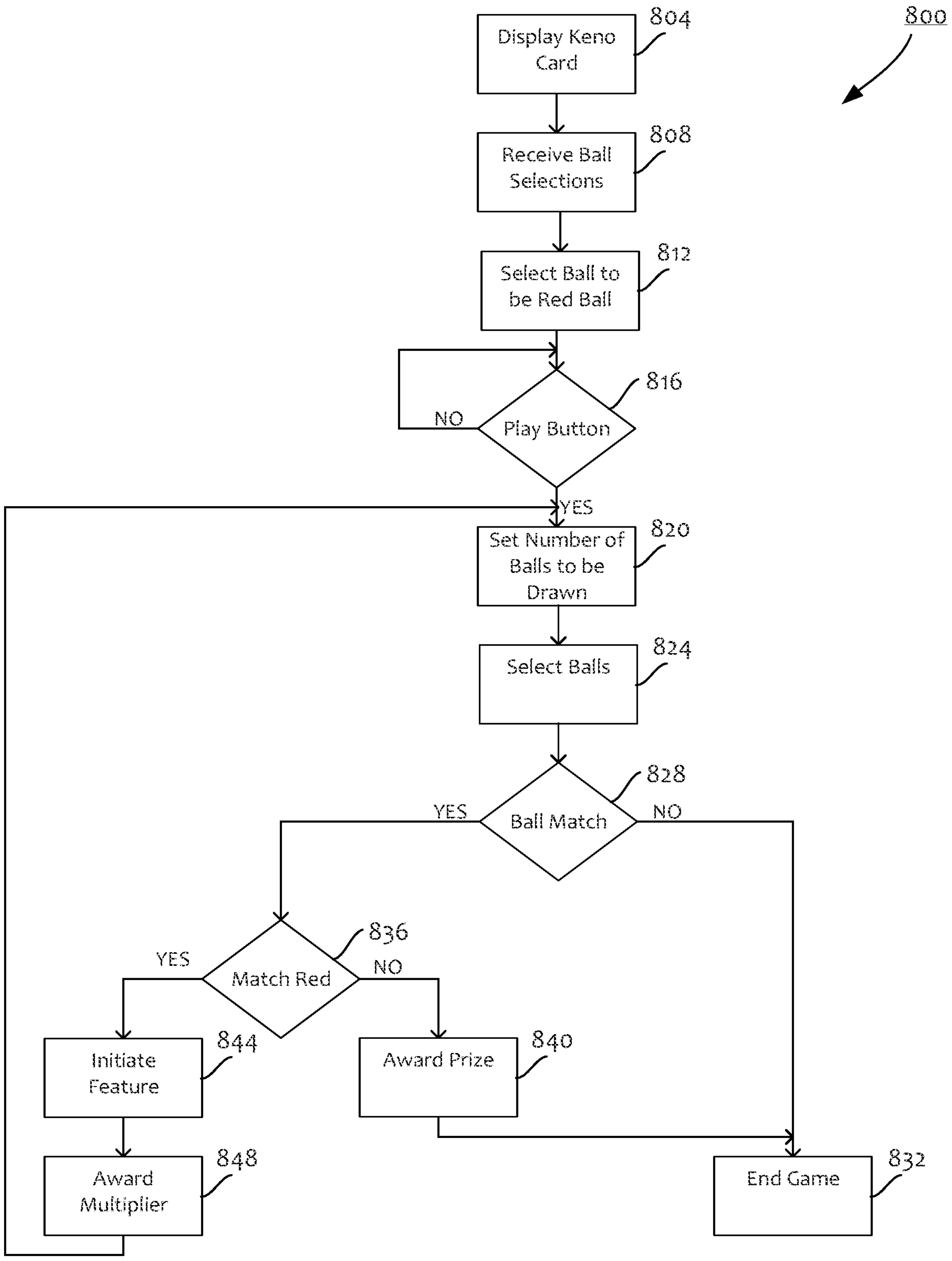
FIG. 8 is an example flow chart of a process for conducting a keno game on an electronic game machine.

FIG. 8 is an example flow chart of a process 800 for conducting a keno game on an electronic game machine. At block 804, when a simulated keno game commences, primary game display 240 may display a keno card, such as, for example, keno card 754. In block 808, a player may select a quantity of keno numbers on the keno card 754 on primary game display 240. As discussed above, a player may also select the quantity of keno numbers on the keno card 754 via a quick pick button, for example, the quick pick button 332.

In block 812, the process 800 proceeds to randomly select a quantity of keno balls to be feature keno balls, or red balls. As discussed above, the quantity of feature keno balls may depend on one or more wager options selected by a player, for example, via top row of buttons 404 or bottom row of buttons 408 of FIG. 4. In block 816, the game controller 202 may determine if the player activates play button 412. If so, the process 800 proceeds to block 820. If not, the block 816 will delay until the play button 412 is activated.

Once at block 820, a quantity of keno balls may be selected for display. For example, the game controller 202 may set the quantity of keno balls to be displayed to be 20 initially. In block 824, the game controller 202 of may randomly select a plurality of the quantity of keno balls, or may select the keno balls based on a bingo game outcome (e.g., in order to present a keno game outcome having a reward that is less than or equal to all or a portion of a reward associated with a bingo game outcome). The primary game display 240 may then animate and/or display the drawn balls falling into cylinder 340.

In block 828, the game controller 202 may evaluate the drawn or selected keno balls to determine if the drawn or selected balls match any of the player selected balls. In some examples, the game controller 202 may have already determined whether there will be drawn or selected balls that match any of the player selected balls (e.g., when presenting a keno game outcome that is less than or equal to a bingo game outcome). If there are no matches, the process 800 may end at block 832. However, if the game controller 202 determines that one or more of the drawn balls match one or more of the player selected balls, the game controller 202 further evaluates if there are any feature hits, where the matched keno ball is a feature keno ball or a red ball, or has a feature keno number, for example, in block 836. In some examples, the game controller 202 may have already determined whether any of the matched keno balls is a feature keno ball (e.g., when presenting a keno game outcome that is less than or equal to a bingo game outcome).

If the game controller 202 determines that no matched ball has been designated as a feature keno ball, the game controller 202 may present an award (and/or reward, prize, etc.) to the player at block 840 based on the number of keno ball matches (and/or hits, catches, etc.), the keno wager (and/or wager multiplier), and/or the keno pay table, and increase credit payout indicator 772, 560 accordingly. In some examples, the award may be less than or equal to all or a portion of an award associated with a bingo game outcome. However, if the game controller 202 determines that one or more matched balls is a feature keno ball in block 836, the game controller 202 may initiate a feature bonus in block 844.

The feature bonus of block 844 may comprise one or more feature multipliers that may be activated by the game controller 202 in block 848. The feature multiplier indicator (s) 512.X associated with the feature multiplier may also be activated and/or highlighted (and/or otherwise emphasized). In some examples, the game controller 202 may additionally (or alternatively) set a quantity of additional keno balls to be drawn in block 844, and use that when repeating the portion of the process 800 beginning at block 820. In some examples, no additional balls may be drawn, and the process may proceed to block 840 to present an award (and/or reward, prize, etc.) to the player at block 840 based on the number of keno ball matches (and/or hits, catches, etc.), the keno wager (and/or wager multiplier), the feature multiplier, and/or the keno pay table, and increase credit payout indicator 772, 560 accordingly. In some examples, additional balls may be drawn at step 824, and the process 800 will continue until eventually (possibly after once again initiating bonus features at block 844) an award is presented to the player at block 840 based on the number of keno ball matches (and/or hits, catches, etc.), the keno wager (and/or wager multiplier), the feature multiplier, and/or the keno pay table, and the credit payout indicator 772, 560 is increased accordingly. In some examples, the game controller 202 may predetermine whether there are any feature hits, additional balls draws, additional feature hits, feature multipliers, etc., (e.g., when presenting a keno game outcome that is less than or equal to a bingo game outcome), and may simply simulate the process as a fagade on the display of the gaming device 200. The process 800 ends at block 852.

Figure 9:
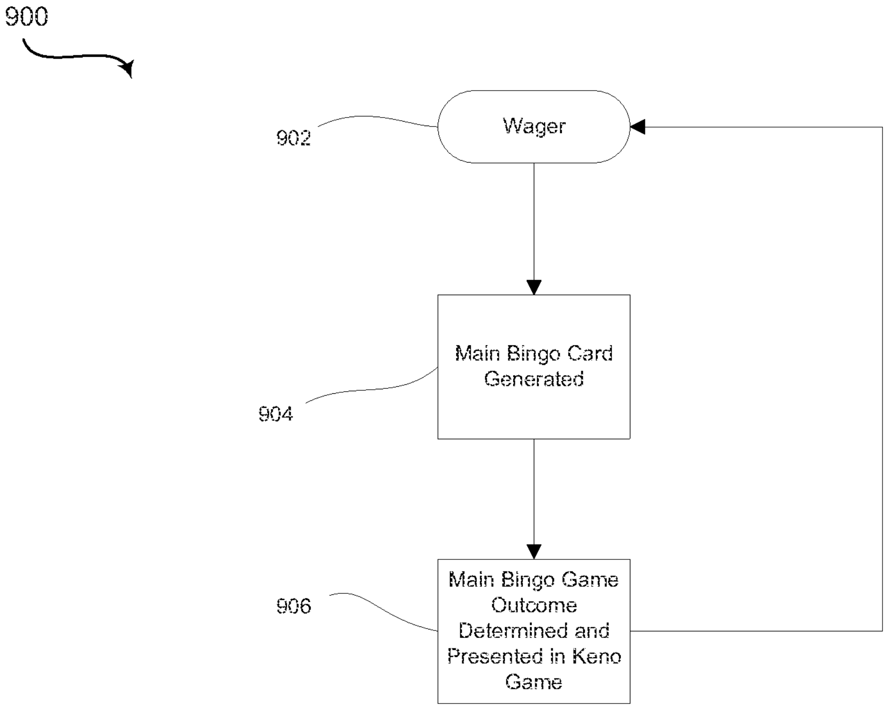
FIG. 9 is a flow chart showing an example method for presenting a non-keno game outcome through a simulated keno game on an electronic gaming machine.

FIG. 9 sets forth a flow chart illustrating steps of an example process 900 for presenting a non-keno game outcome through a simulated keno game on an electronic gaming machine. At step 902, the player makes a wager (e.g., a bingo game wager and/or keno game wager) via a user interface of the gaming machine 200. At step 904, a bingo card 708 is generated (and/or selected) in response to the wager. Assuming enough players are participating in the bingo game, a bingo number listing (i.e. a bingo ball draw) will be generated, received, and/or displayed. In some examples, the bingo number listing may already have been generated prior to step 904, such as, for example, where the bingo game was already underway prior to step 904 and/or 902. At step 906, the bingo card 708 is compared with the bingo number listing 414 and an associated bingo game pay table 430, and a bingo game outcome (with an associated reward) is determined. A bingo game award may be included in the bingo game outcome. During the same step 906, the gaming machine 200 may simulate a keno game to present a keno game outcome having a reward that is less than or equal to all or a portion of the reward associated with the bingo game outcome.

As indicated above, the method may be embodied in program code. The program code could be supplied in a number of ways, for example on a tangible computer readable storage medium, such as a disc or a memory device, e.g. an EEPROM, (for example, that could replace part of memory 208) or as a data signal (for example, by transmitting it from a server). Further different parts of the program code can be executed by different devices, for example in a client server relationship. Persons skilled in the art will appreciate that program code provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming machine, comprising:

one or more input devices;

one or more display devices; and a gaming controller executing instructions stored in a memory, wherein execution of the instructions causes the gaming controller to at least:

receive, via the one or more input devices, one or more player selections that define a player-chosen quantity of feature objects and a set of player-chosen numbers;

designate a quantity of numbered objects in a set of numbered objects as the player-chosen quantity of feature objects;

select a first subset of numbered objects from the set of numbered objects, the selected first subset of numbered objects including zero or more numbered objects designated as feature objects;

present the selected first subset of numbered objects via the one or more display devices;

determine an award that is dependent upon a hit count and a feature hit count, wherein the hit count represents a first quantity of player-chosen numbers in the set of player-chosen numbers that match at least one numbered object in the selected first subset of numbered objects, and wherein the feature hit count represents a second quantity of player-chosen numbers in the set of player-chosen numbers that match at least one feature object in the selected first subset of numbered objects; and display, via the one or more display devices, the award.

2. The gaming machine of claim 1, wherein:

the one or more input devices provide a plurality of wager options; and each wager option of the plurality of wager options is associated with a different wager amount and quantity of feature objects.

3. The gaming machine of claim 1, wherein execution of the instructions causes the gaming controller to:

determine a multiplier value based on the feature hit count; and determine the presented award based on a base award associated with the hit count multiplied by the determined multiplier value.

4. The gaming machine of claim 1, wherein execution of the instructions causes the gaming controller to:

present, via the one or more display devices, a matrix displaying at least the set of numbered objects;

update the matrix to identify the set of player-chosen numbers;

display, the first subset of numbered objects, in an order that matches an order of selection of the first subset of numbered objects from the set of numbered objects; and update the matrix to identify the set of player-chosen numbers that match at least one feature object in the selected first subset of numbered objects.

5. The gaming machine of claim 1, wherein execution of the instructions causes the gaming controller to present a quantity of multiplier indicators equal to the player-chosen quantity of feature objects.

6. The gaming machine of claim 1, wherein execution of the instructions causes the gaming controller to:

present a list of multiplier indicators via the one or more display devices; and activate a quantity of the multiplier indicators equal to the player-chosen quantity of feature objects.

7. The gaming machine of claim 1, wherein execution of the instructions causes the gaming controller to:

present, via the one or more display devices, a list of multiplier indicators in ascending order of associated multiplier values; and highlight a respective one of the list of multiplier indicators in ascending order as feature objects of the selected first subset of numbered objects match at least one player-chosen number in the set of player-chosen numbers.

8. The gaming machine of claim 7, wherein execution of the instructions causes the gaming controller to:

award the multiplier value associated with the highlighted one of the list of multiplier indicators; and determine the presented award based on a base award associated with the hit count multiplied by the awarded multiplier value.

9. The gaming machine of claim 1, wherein execution of the instructions causes the gaming controller to:

select zero of more additional subsets of numbered objects from the set of numbered objects, wherein the zero of more additional subsets include an additional subset for each feature object in the selected first subset of numbered objects that matches a player-chosen number in the set of player-chosen numbers;

present the zero or more additional subsets of numbered objects via the one or more display devices; and update the hit count based on a third quantity of player-chosen numbers in the set of player-chosen numbers that match at least one numbered object in the zero or more additional subsets of numbered objects; and update the feature hit count based on a fourth quantity of player-chosen numbers in the set of player-chosen numbers that match at least one feature object in the zero or more additional subsets of numbered objects.

10. The gaming machine of claim 9, wherein execution of the instructions causes the gaming controller to:

receive called bingo numbers from a network;

determine, based on the called bingo numbers, a bingo game outcome and associated bingo game award; and select, based at least on the set of player-chosen numbers, the selected first subset of numbered objects and the zero of more additional subsets of numbered objects such that the presented award equals the associated bingo game award.

11. The gaming machine of claim 1, comprising a credit input mechanism, wherein execution of the instructions causes the gaming controller to:

establish a credit balance in response to the credit input mechanism receiving a physical medium with an associated credit value; and update the credit balance based on wagering activity.

12. A method of a gaming machine, the method comprising:

receiving, via one or more input devices of the gaming machine, one or more player selections that define a player-chosen quantity of feature objects and a set of player-chosen numbers;

designating, with a gaming controller of the gaming machine, a quantity of numbered objects in a set of numbered object as the player-chosen quantity of feature objects;

selecting, with the gaming controller, a pay table based at least upon a quantity of player-chosen numbers in the set of player-chosen numbers;

selecting, with the gaming controller, a first subset of numbered objects from the set of numbered objects such that the selected first subset of numbered objects includes from zero feature objects up to the player-chosen quantity of feature objects from the set of numbered objects;

presenting the selected first subset of numbered objects via one or more display devices; and presenting, via the one or more display devices, an award that is dependent upon a hit count, a feature hit count, and the selected pay table, wherein the hit count represents a first quantity of player-chosen numbers in the set of player-chosen numbers that match at least one numbered object in the selected first subset of numbered objects, and wherein the feature hit count represents a second quantity of player-chosen numbers in the set of player-chosen numbers that match at least one feature object in the selected first subset of numbered objects.

13. The method of a claim 12, wherein:

receiving the one or more player selections comprises receiving a wager amount and the player-chosen quantity of feature objects based on selection of a wager option of a plurality of wager options; and each wager option of the plurality of wager options is associated with a different wager amount and quantity of feature objects.

14. The method of claim 12, comprising:

awarding a multiplier value based on the feature hit count; and determining the presented award based on a base award, which the selected pay table associates with the hit count, multiplied by the awarded multiplier value.

15. The method of claim 12, comprising presenting a quantity of multiplier indicators equal to the player-chosen quantity of feature objects.

16. The method of claim 12, comprising:

presenting a list of multiplier indicators via the one or more display devices; and activating a quantity of the multiplier indicators equal to the player-chosen quantity of feature objects.

17. The method of claim 12, comprising:

presenting a list of multiplier indicators in ascending order of associated multiplier values; and highlighting a respective one of the list of multiplier indicators in ascending order as feature objects of the selected first subset of numbered objects match at least one player-chosen number in the set of player-chosen numbers.

18. The method of claim 17, comprising:

awarding the multiplier value associated with the highlighted one of the list of multiplier indicators; and determining the presented award based on a base award, which the selected pay table associates with the hit count, multiplied by the awarded multiplier value.

19. The method of claim 12, comprising:

selecting, with the gaming controller, a second subset of numbered objects from the set of numbered objects in response to a feature object in the selected first subset of numbered objects matching a player-chosen number in the set of player-chosen numbers;

presenting the selected second subset of numbered objects via the one or more display devices; and increasing the hit count based on a third quantity of player-chosen numbers in the set of player-chosen numbers that match at least one numbered object in the selected second subset of numbered objects; and increasing the feature hit count based on a fourth quantity of player-chosen numbers in the set of player-chosen numbers that match at least one feature object in the selected second subset of numbered objects.

20. The method of claim 19, comprising:

receiving called bingo numbers from a network;

determining, based on the called bingo numbers, a bingo game outcome and associated bingo game award; and selecting, based on the set of player-chosen numbers, at least the selected first subset of numbered objects and the second subset of numbered objects such that the presented award equals the associated bingo game award.

* * * * *